(12) United States Patent
Ramberg et al.

(10) Patent No.: US 8,361,420 B2
(45) Date of Patent: Jan. 29, 2013

(54) POROUS BODIES AND METHODS

(75) Inventors: Charles E. Ramberg, Los Altos Hills, CA (US); Stephen A. Dynan, Boalsburg, PA (US); Jack A. Shindle, Rutland, MA (US)

(73) Assignee: Errcive, Inc., Boalsburg, PA (US)

( * ) Notice: Subject to any disclaimer, the term of this patent is extended or adjusted under 35 U.S.C. 154(b) by 0 days.

(21) Appl. No.: 12/671,825

(22) PCT Filed: Jul. 31, 2008

(86) PCT No.: PCT/US2008/071793
§ 371 (c)(1),
(2), (4) Date: Aug. 9, 2010

(87) PCT Pub. No.: WO2009/020835
PCT Pub. Date: Feb. 12, 2009

(65) Prior Publication Data
US 2010/0298124 A1 Nov. 25, 2010

Related U.S. Application Data

(60) Provisional application No. 60/963,088, filed on Aug. 3, 2007.

(51) Int. Cl.
*B01D 47/00* (2006.01)
*B01D 53/56* (2006.01)
*B01D 46/00* (2006.01)
*B01D 37/00* (2006.01)
*C01F 1/00* (2006.01)
*B01J 10/00* (2006.01)

(52) U.S. Cl. .......... 423/210; 423/130; 423/247; 95/273; 210/767; 422/129

(58) Field of Classification Search ....................... None
See application file for complete search history.

(56) References Cited

U.S. PATENT DOCUMENTS 293,745 A 2/1884 Hyatt
1,852,489 A 4/1932 Sullivan (Continued)

FOREIGN PATENT DOCUMENTS

EP 0337047 10/1998
EP 1600202 * 11/2005

(Continued)

OTHER PUBLICATIONS

DeFord, H.D. et al. "extrusion of Lightweight Construction Materials from Fly Ash". Ceram. Eng. Sci. Proc., 14[1-2], 298-308 (1993).*

(Continued)

*Primary Examiner* — Melvin C Mayes
*Assistant Examiner* — Sheng H Davis

(57) ABSTRACT

Systems and methods for treating a fluid with a body are disclosed. Various aspects involve treating a fluid with a porous body. In select embodiments, a body comprises ash particles, and the ash particles used to form the body may be selected based on their providing one or more desired properties for a given treatment. Various bodies provide for the reaction and/or removal of a substance in a fluid, often using a porous body comprised of ash particles. Computer-operable methods for matching a source material to an application are disclosed. Certain aspects feature a porous body comprised of ash particles, the ash particles have a particle size distribution and interparticle connectivity that creates a plurality of pores having a pore size distribution and pore connectivity, and the pore size distribution and pore connectivity are such that a first fluid may substantially penetrate the pores.

22 Claims, 13 Drawing Sheets

U.S. PATENT DOCUMENTS

| | | | |
|---|---|---|---|
| 2,449,822 A | 9/1948 | Schibbye | |
| 2,544,752 A | 3/1951 | Gelbman | |
| 2,892,240 A | 6/1959 | Frankenhoff | |
| 2,926,137 A | 2/1960 | Calvert | |
| 2,946,112 A | 7/1960 | Tucker, Jr. | |
| 3,343,680 A | 9/1967 | Rice et al. | |
| 3,505,008 A | 4/1970 | Frevel et al. | |
| 3,574,530 A | 4/1971 | Suriani et al. | |
| 3,704,786 A | 12/1972 | Lerner et al. | |
| 3,739,553 A | 6/1973 | Aine | |
| 3,824,196 A | 7/1974 | Benbow et al. | |
| 3,885,977 A | 5/1975 | Lachman et al. | |
| 3,940,301 A | 2/1976 | Straw et al. | |
| 3,942,990 A | 3/1976 | Engstrom et al. | |
| 3,953,562 A | 4/1976 | Hait et al. | |
| 3,953,703 A | 4/1976 | Hurwitt | |
| 3,954,672 A | 5/1976 | Somers et al. | |
| 3,957,694 A | 5/1976 | Bolon et al. | |
| 3,975,201 A | 8/1976 | Greenstein | |
| 3,991,149 A | 11/1976 | Hurwitt | |
| 4,006,533 A | 2/1977 | Squires | |
| 4,025,462 A | 5/1977 | Cleveland | |
| 4,041,591 A | 8/1977 | Noll et al. | |
| 4,041,592 A | 8/1977 | Kelm | |
| 4,069,063 A | 1/1978 | Ball | |
| 4,071,369 A | 1/1978 | Kurz et al. | |
| 4,073,729 A | 2/1978 | Kraemer et al. | |
| 4,080,414 A | 3/1978 | Anderson et al. | |
| 4,107,013 A | 8/1978 | McGinniss et al. | |
| 4,110,187 A | 8/1978 | Sloan et al. | |
| 4,120,735 A | 10/1978 | Smith | |
| 4,124,365 A | 11/1978 | Williams et al. | |
| 4,142,864 A | 3/1979 | Rosynsky et al. | |
| 4,166,037 A | 8/1979 | Montagnon | |
| 4,190,533 A | 2/1980 | Hirs | |
| 4,191,546 A | 3/1980 | Kroyer | |
| 4,197,205 A | 4/1980 | Hirs | |
| 4,225,443 A | 9/1980 | Harris et al. | |
| 4,253,992 A | 3/1981 | Soejima et al. | |
| 4,254,616 A | 3/1981 | Siminski et al. | |
| 4,255,166 A | 3/1981 | Gernand et al. | |
| 4,264,346 A | 4/1981 | Mann | |
| 4,276,062 A | 6/1981 | Lyon et al. | |
| 4,276,071 A | 6/1981 | Outland | |
| 4,293,514 A | 10/1981 | Wada | |
| 4,329,162 A | 5/1982 | Pitcher, Jr. | |
| 4,353,854 A | 10/1982 | Oyamada et al. | |
| 4,379,039 A | 4/1983 | Fujimoto et al. | |
| 4,415,344 A | 11/1983 | Frost et al. | |
| 4,416,675 A | 11/1983 | Montierth | |
| 4,430,108 A | 2/1984 | Hojaji et al. | |
| 4,436,682 A | 3/1984 | Knopp | |
| 4,440,867 A | 4/1984 | Sbherwal | |
| 4,452,635 A | 6/1984 | Noshi et al. | |
| 4,483,944 A | 11/1984 | Day et al. | |
| 4,587,068 A | 5/1986 | Borase et al. | |
| 4,601,332 A | 7/1986 | Oda et al. | |
| 4,613,374 A | 9/1986 | Smith | |
| 4,626,359 A | 12/1986 | Bennett et al. | |
| 4,629,483 A | 12/1986 | Stanton | |
| 4,637,995 A | 1/1987 | DeAngelis et al. | |
| 4,645,605 A | 2/1987 | Durham | |
| 4,652,411 A | 3/1987 | Swarr et al. | |
| 4,681,788 A | 7/1987 | Barito et al. | |
| 4,743,382 A | 5/1988 | Williamson et al. | |
| 4,747,945 A | 5/1988 | Kreusch et al. | |
| 4,777,153 A | 10/1988 | Sonuparlak et al. | |
| 4,786,342 A | 11/1988 | Zellner et al. | |
| 4,804,521 A | 2/1989 | Rochelle et al. | |
| 4,863,538 A | 9/1989 | Deckard | |
| 4,871,495 A | 10/1989 | Helferich et al. | |
| 4,877,506 A | 10/1989 | Fee et al. | |
| 4,883,497 A | 11/1989 | Claar et al. | |
| 4,888,054 A | 12/1989 | Pond | |
| 4,898,105 A | 2/1990 | Rappoldt et al. | |
| 4,898,631 A | 2/1990 | Collins, Jr. | |
| 4,944,817 A | 7/1990 | Bourrell et al. | |
| 4,964,888 A | 10/1990 | Miller | |
| 4,968,460 A | 11/1990 | Thompson et al. | |
| 4,973,459 A | 11/1990 | Lippert et al. | |
| 4,976,760 A | 12/1990 | Helferich et al. | |
| 5,002,710 A | 3/1991 | Shanefield et al. | |
| 5,071,449 A | 12/1991 | Sircar | |
| 5,086,093 A | 2/1992 | Miller | |
| 5,100,633 A | 3/1992 | Morrison | |
| 5,108,614 A | 4/1992 | Ross et al. | |
| 5,145,826 A * | 9/1992 | Hirschberg et al. | 502/262 |
| 5,203,936 A | 4/1993 | Dolhert et al. | |
| 5,204,055 A | 4/1993 | Sachs et al. | |
| 5,215,724 A | 6/1993 | Haerle | |
| 5,221,484 A | 6/1993 | Goldsmith et al. | |
| 5,229,078 A | 7/1993 | Haerle | |
| 5,232,955 A | 8/1993 | Csabai et al. | |
| 5,238,057 A | 8/1993 | Schelter et al. | |
| 5,240,485 A | 8/1993 | Haerle et al. | |
| 5,244,726 A | 9/1993 | Laney et al. | |
| 5,256,609 A | 10/1993 | Dolhert | |
| 5,266,279 A | 11/1993 | Haerle | |
| 5,275,771 A | 1/1994 | Bush et al. | |
| 5,279,994 A | 1/1994 | Kerkar | |
| 5,284,695 A | 2/1994 | Barlow et al. | |
| 5,292,436 A | 3/1994 | Mathews | |
| 5,306,646 A | 4/1994 | Lauf | |
| 5,322,562 A | 6/1994 | Ellenberger et al. | |
| 5,335,492 A | 8/1994 | Zirkel | |
| 5,345,761 A | 9/1994 | King et al. | |
| 5,364,573 A | 11/1994 | Noky | |
| 5,401,481 A * | 3/1995 | Rochelle et al. | 423/331 |
| 5,401,695 A | 3/1995 | Wu | |
| 5,405,571 A | 4/1995 | Truckner et al. | |
| 5,409,870 A | 4/1995 | Locker et al. | |
| 5,425,236 A | 6/1995 | Haerle | |
| 5,427,721 A | 6/1995 | Brezny et al. | |
| 5,429,779 A | 7/1995 | Locker et al. | |
| 5,433,904 A | 7/1995 | Noky | |
| 5,456,965 A | 10/1995 | Machida et al. | |
| 5,473,008 A | 12/1995 | Hessel et al. | |
| 5,476,375 A | 12/1995 | Kinkis et al. | |
| 5,497,620 A | 3/1996 | Stobbe | |
| 5,498,288 A | 3/1996 | Noky | |
| 5,519,087 A | 5/1996 | Tang | |
| 5,525,665 A | 6/1996 | Moeggenborg et al. | |
| 5,547,640 A | 8/1996 | Kim | |
| 5,551,971 A | 9/1996 | Chadderton et al. | |
| 5,626,763 A | 5/1997 | Mathews | |
| 5,639,402 A | 6/1997 | Barlow et al. | |
| 5,645,730 A * | 7/1997 | Malachosky et al. | 210/665 |
| 5,658,372 A | 8/1997 | Gadkaree | |
| 5,686,039 A | 11/1997 | Merry | |
| 5,705,444 A | 1/1998 | Tompkins et al. | |
| 5,707,574 A | 1/1998 | Domesle et al. | |
| 5,711,833 A | 1/1998 | Apte et al. | |
| 5,714,228 A | 2/1998 | Beckmeyer et al. | |
| 5,728,198 A | 3/1998 | Acharya et al. | |
| 5,731,562 A | 3/1998 | Beckmeyer et al. | |
| 5,733,352 A | 3/1998 | Ogawa et al. | |
| 5,750,026 A * | 5/1998 | Gadkaree et al. | 210/502.1 |
| 5,766,528 A | 6/1998 | Su et al. | |
| 5,901,683 A | 5/1999 | Patel | |
| 5,904,892 A | 5/1999 | Holmes et al. | |
| 5,965,257 A | 10/1999 | Ahluwalia | |
| 5,983,488 A | 11/1999 | Erickson et al. | |
| 5,997,794 A | 12/1999 | Huang et al. | |
| 6,196,344 B1 | 3/2001 | Tamor et al. | |
| 6,200,379 B1 | 3/2001 | Strabala | |
| 6,238,618 B1 * | 5/2001 | Brundage et al. | 264/638 |
| 6,258,334 B1 | 7/2001 | Gadkaree et al. | |
| 6,290,847 B1 | 9/2001 | Cutler | |
| 6,296,794 B1 | 10/2001 | Day et al. | |
| 6,322,605 B1 | 11/2001 | He et al. | |
| 6,328,779 B1 | 12/2001 | He et al. | |
| 6,368,102 B1 | 4/2002 | Ibrahim et al. | |
| 6,375,451 B1 | 4/2002 | Robinson et al. | |
| 6,405,875 B1 | 6/2002 | Cutler | |
| 6,421,599 B1 | 7/2002 | Lippa et al. | |
| 6,440,198 B1 * | 8/2002 | Yang et al. | 95/275 |
| 6,454,941 B1 | 9/2002 | Cutler et al. | |

| | | | |
|---|---|---|---|
| 6,461,632 B1 | 10/2002 | Gogolewski | |
| 6,464,744 B2 | 10/2002 | Cutler et al. | |
| 6,468,325 B1 | 10/2002 | Cutler et al. | |
| 6,492,119 B1 | 12/2002 | Ogawa | |
| 6,612,835 B2 | 9/2003 | Ibrahim et al. | |
| 6,613,299 B2 | 9/2003 | Dang et al. | |
| 6,673,300 B2 | 1/2004 | Allen et al. | |
| 6,695,967 B2 | 2/2004 | Bishop et al. | |
| 6,696,132 B2 | 2/2004 | Beall et al. | |
| 6,743,513 B2 | 6/2004 | Mecholsky et al. | |
| 6,755,016 B2 | 6/2004 | Dittler et al. | |
| 6,770,111 B2 | 8/2004 | Morena et al. | |
| 6,827,754 B2 | 12/2004 | Suwabe et al. | |
| 6,835,224 B2 | 12/2004 | Cheng | |
| 6,843,822 B2 | 1/2005 | Beall et al. | |
| 6,849,181 B2* | 2/2005 | Ogunwumi et al. | 210/510.1 |
| 6,881,703 B2 | 4/2005 | Cutler et al. | |
| 6,883,321 B2 | 4/2005 | Fornoff | |
| 6,887,291 B2 | 5/2005 | Alford et al. | |
| 6,890,616 B2 | 5/2005 | Suwabe et al. | |
| 6,923,941 B2 | 8/2005 | Huthwohl et al. | |
| 6,946,013 B2 | 9/2005 | Alward et al. | |
| 6,991,668 B2 | 1/2006 | Towsley | |
| 7,008,461 B2 | 3/2006 | Kuki et al. | |
| 7,011,803 B2 | 3/2006 | Ichikawa et al. | |
| 7,087,109 B2 | 8/2006 | Bredt et al. | |
| 7,110,904 B2 | 9/2006 | Lippa et al. | |
| 7,112,233 B2 | 9/2006 | Ohno et al. | |
| 7,291,197 B2 | 11/2007 | Costura et al. | |
| 7,328,805 B2 | 2/2008 | Price et al. | |
| 7,340,887 B2 | 3/2008 | Ante et al. | |
| 7,514,010 B2 | 4/2009 | Salmon | |
| 7,585,352 B2 | 9/2009 | Dunn | |
| 7,655,088 B2 | 2/2010 | Bethani | |
| 7,695,559 B1 | 4/2010 | Chartier et al. | |
| 7,749,476 B2 | 7/2010 | Constantz et al. | |
| 7,754,169 B2 | 7/2010 | Constantz et al. | |
| 8,007,573 B2* | 8/2011 | Bansal et al. | 96/4 |
| 2002/0003112 A1* | 1/2002 | Golden | 210/725 |
| 2005/0109023 A1* | 5/2005 | Kudo et al. | 60/311 |
| 2005/0161849 A1 | 7/2005 | Ohno et al. | |
| 2005/0232827 A1 | 10/2005 | Merry | |
| 2006/0162929 A1 | 7/2006 | Urbanek | |
| 2006/0210765 A1 | 9/2006 | Ohno et al. | |
| 2006/0228521 A1 | 10/2006 | Ohno et al. | |
| 2006/0251909 A1 | 11/2006 | Beall et al. | |
| 2006/0272319 A1 | 12/2006 | Dettling et al. | |
| 2006/0287197 A1 | 12/2006 | Maslanka et al. | |
| 2007/0006561 A1 | 1/2007 | Brady et al. | |
| 2007/0032370 A1 | 2/2007 | Weisensel et al. | |
| 2007/0063397 A1* | 3/2007 | Inoue | 264/628 |
| 2007/0179056 A1* | 8/2007 | Baek et al. | 502/400 |
| 2007/0215353 A1* | 9/2007 | Barron et al. | 166/292 |
| 2007/0224565 A1 | 9/2007 | Briselden | |
| 2007/0261378 A1 | 11/2007 | Miao et al. | |
| 2008/0014405 A1 | 1/2008 | Sakamoto | |
| 2008/0017572 A1 | 1/2008 | Kudo | |
| 2008/0017573 A1 | 1/2008 | Pyzik et al. | |
| 2008/0044319 A1 | 2/2008 | Takahashi et al. | |
| 2008/0072551 A1* | 3/2008 | Zuberi | 55/385.1 |
| 2008/0226346 A1 | 9/2008 | Hull et al. | |
| 2009/0044515 A1 | 2/2009 | Lu et al. | |
| 2010/0083834 A1 | 4/2010 | Varadaraj | |
| 2010/0101464 A1 | 4/2010 | Leach et al. | |
| 2010/0183490 A1 | 7/2010 | Hoke et al. | |
| 2010/0251937 A1 | 10/2010 | Murray et al. | |
| 2011/0100910 A1 | 5/2011 | Johansen et al. | |
| 2012/0082601 A1 | 4/2012 | Sutherland | |
| 2012/0148457 A1 | 6/2012 | Sutherland et al. | |

FOREIGN PATENT DOCUMENTS

| | | | |
|---|---|---|---|
| JP | 11029346 A | | 2/1999 |
| JP | 2002248498 A | | 9/2002 |
| JP | 2005060159 A | | 3/2005 |
| JP | 20060004920 A | | 1/2006 |
| KR | 2003389582 | * | 1/2003 |
| KR | 20030022221 A | | 1/2003 |

OTHER PUBLICATIONS

Kim, Sung-Jin, et al. "Fabrication and Physical Properties of Honeycomb Type Cordierite Ceramic Filter Using Fly Ash". Journal of the Korean Ceramic Society. 43, 351-357 (2006).*

Montes-Hernandez, G. etal. "Mineral Sequestration of $CO_2$ by aqueous carbonation of coal combustion fly ash" Journal of Hazardous Materials, 161, 1347-1354 (2008).*

Tawfic, T.A. et al. "Ash to Reduce Trace Element Mobility" Wyoming Water Resources Center (1995).*

Kim, Sung "Fabrication of Cordierite Honeycomb from Fly Ash" Material Science Forum vols. 534-536, 621-624 (2006).*

An initial study of the fine fragmentationfly ash particle mode generated during pulverized coal combustion, W. S. Seames, Fuel Processing Technology, 81, pp. 109-125 (2003).

Characterization of a glass-ceramic produced from thermal power plant fly ashes, M. Erol, A. Genc, M.L. Ovecoglu, E. Yucelen, S. Kucukbayrak, Y. Taptik, J. Europ. Ceram. Soc., 20, pp. 2209-2214 (2000).

Characterization of the bottom ash in municipal solid waste incinerator, J. M. Chimenos, M. Segarra, M. A. Fernandez, F. Espiell, Journ. Hazard. Materials, A:64, pp. 211-222 (1999).

Crystallization and properties of glasses prepared from Illinois coal fly ash, E. J. DeGuire, S. H. Risbud, J. Mat. Sci., 19, pp. 1760-1766 (1984).

Commercially Useful By-Products of Coal Combustion, M. R. Gottschalk, J. R. Hellmann, B. E. Scheetz, Ceramic Transactions, vol. 119, pp. 125-134 (2001).

Viscous Sintering of Coal Ashes. 2. Sintering Behavior at Short Residence Times in a Drop Tube Furnace, B. Jung & H. Schobert, Energy & Fuels, 6, pp. 59-68 (1992).

Conversion to glass-ceramics from glasses made by MSW incinterator fly ash for recycling, Y.J. Park, J. Heo, Ceramics Int'l., 28, pp. 689-694 (2002).

Ceramic Diesel Particulate Filters, J. Adler, Int. J. Appl. Ceram. Technol., 2 [6] pp. 429-439 (2005).

Specifier's Guide for Pervious Concrete Pavement Design, Version 1.2, Colorado Ready Mixed Concrete Association, Centennial, CO. Publication date unknown; downloaded from www.crmca.org Aug. 2009.

Porous Silicon Nitride for Low Pressure Loss DPF, Hayashi, Ichiro; Shinohara, Nobuhiro; Watanabe, Toshinari; Takahashi, Hideo; Reports Res. Lab. Asahi Glass Col, Ltd., 56, pp. 25-27 (2005).

Extrusion of Lightweight Construction Materials from Fly Ash, H.D. DeFord & G.P. Wirtz, Ceram. Eng. Sci. Proc. 14 [1-2] pp. 298-308 (1993).

Characterization of glass ceramics made from incinerator fly ash, T.W. Cheng & Y. S. Chen, Ceramics International, 30, pp. 343-349 (2004).

Characterization of α-cordierite glass-ceramics from fly ash, Yong He, Weimin Chang, Hesheng Cai, Journ. Hazardous Mat. B120, pp. 265-269 (2005).

Cristobalite formation from thermal treatment of Texas lignite fly ash, M.Y.A. Mollah, S. Promreuk, R. Schennach, D.L. Cocke, R. Guler, Fuel, 78, pp. 1277-1282 (1999).

Densification of ashes from a thermal power plant, E. Benavidez, C. Grasselli, N. Quaranta, Ceramics International, 29, pp. 61-68 (2003).

Effect of borate addition on the sintered properties of pulverized fly ash, E.A. Uwe, A.R. Boccaccini, S.G. Cook, C.R. Cheeseman, Ceramics International, 33, pp. 993-999 (2007).

Engineering and environmental properties of thermally treated mixtures containing MSWI fly ash and low-cost additives, A. Polettini, R. Pomi, L. Trinci, A. Muntoni, S. Lo Mastro, Chemosphere, 56, pp. 901-910 (2004).

Flyash as Support for Ni Catalysts in Carbon Dioxide Reforming of Methane, S. Wang, G.Q. Lu, H. Y. Zhu, Chemistry Letters, pp. 385-386 (1999).

Mineralogy and microstructure of sintered lignite coal fly ash, M. Ilic, C. Cheeseman, C. Sollars, J. Knight, Fuel, 82, pp. 331-336 (2003).

Mullite ceramics derived from coal fly ash, J.S. Jung, H.C. Park, R. Stevens, Journ. Mat. Sci. Letters, 20, pp. 1089-1091 (2001).

Physical-mechanical and environmental properties of sintered municipal incinerator fly ash, G. De Casa, T. Mangialardi, A. E. Paolini, L. Piga, Waste Management, 27, pp. 238-247 (2007).
Processing and properties of a glass-ceramic from coal fly ash from a thermal power plant through an economic process, J. M. Kim, H, S. Kim, Journ. Europ. Ceram. Soc., 24, pp. 2825-2833 (2004).
Sintering of a class F fly ash, J. J. Biernacki, A. K. Vazrala, H. W> Leimer, Fuel, 87, pp. 782-792 (2008).
Synthesis of cordierite from fly ash and its refractory properties, S. Kumar, K.K. Singh, P. Ramachandrarao, Journ. Mat. Sci. Letters, 19, pp. 1263-1265 (2000).
International Search Report and Written Opinion, prepared by KIPO for PCT/US2008/071793, "Porous Bodies and Methods" (Feb. 2009).
Office Action mailed Dec. 21, 2010 in (U.S. Appl. No. 12/183,917).
Machine translation of KR 2003002221 A, provided by USPTO with Office Action mailed Dec. 21, 2010 in U.S. Appl. No. 12/183,917, Jeong, In-Hwa, et al.
Office Action mailed Oct. 20, 2011 in U.S. Appl. No. 12/699,736.
Supplementary European Search Report received from the European Patent Office for European Patent Application 08796966.3-2113/ 2180933 (PCT/US2008071793), which is related to PCT Patent Application No. PCT/US08/71793, U.S. Appl. No. 12/183,917 and their related applications.
Machine translation of JP 11029346, Yamamoto, Haruo.
Office Action mailed Aug. 12, 2011 in U.S. Appl. No. 13/152,275.
Office Action mailed Aug. 12, 2011 in U.S. Appl. No. 13/152,273.
U.S. Appl. No. 12/756,987, filed Apr. 8, 2010, Ramberg, Substrate Fabrication, Jan. 9, 2012, Office Actions May 16, 2012.
U.S. Appl. No. 13/327,300, filed Dec. 15, 2011, Ramberg, Porous Bodies and Methods, Office Actions Jan. 25, 2012, May 3, 2012.
U.S. Appl. No. 12/671,825, filed Aug. 9, 2010, Ramberg, Porous Bodies and Methods, Office Actions Jan. 20, 2011; Jun. 13, 2011, Dec. 9, 2011.
Advisory Action mailed May 14, 2012 in (U.S. Appl. No. 12/699,736).
Office Action mailed May 3, 2012 in U.S. Appl. No. 13/327,300.
Machine Translation of JP 2002-24898 A, published Sep. 3, 2002, as provided by USPTO in (U.S. Appl. No. 13/327,300) May 3, 2012.
Machine Translation of abstract of JP 2005-060159 A, published Mar. 10, 2005, as provided by USPTO in (U.S. Appl. No. 13/327,300) May 3, 2012.
Grutzeck, et al., "Zeolites Synthesized from Class F Fly Ash and Sodium Aluminate Slurry" 1997, J. Am. Ceram. Soc., 80 [9] as provided by USPTO in (U.S. Appl. No. 13/327,300) May 3, 2012.
Wang et. al., "Characterizing the Metal Absorption Capacity of a Class F Coal Fly Ash," Environ. Sci., Technol., 2004, 38, 6710-6715, as provided by USPTO in (U.S. Appl. No. 13/327,300) May 3, 2012.
U.S. Appl. No. 12/756,987, filed Apr. 8, 2010, Ramberg, Substrate Fabrication, Office Actions Jan. 9, 2012.
U.S. Appl. No. 12/699,736, filed Feb. 3, 2010, Ramberg, Porous Bodies and Methods, Office Actions Oct. 20, 2011, Feb. 13, 2012.
U.S. Appl. No. 13/316,534, filed Dec. 11, 2011, Ramberg, Porous Bodies and Methods, Office Actions Jan. 26, 2012.
U.S. Appl. No. 13/327,300, filed Dec. 15, 2011, Ramberg, Porous Bodies and Methods, Office Actions Jan. 25, 2012.
Office Action mailed Jan. 25, 2012 in (U.S. Appl. No. 13/327,300).
Office Action mailed Jan. 26, 2012 in (U.S. Appl. No. 13/316,534)).
Response to Supplementary European Search Report associated with (European patent application No. 08 796 966.3-2113, which is the National Stage application associated with PCT/US08/71793, which is the related PCT application of U.S. Appl. Nos. 12/183,917, 12/671,825, and their child applications).
Office Action mailed Feb. 13, 2012 in U.S. Appl. No. 12/699,736.
Machine translation of JP 2006004920 (Jan. 2006), Yasuda Masahiro.
Translation of EP-0337047, Oct. 1998 (DeBoodt).
U.S. Appl. No. 12/756,987, filed Jan. 9, 2012, Ramberg, Substrate Fabrication, Office Actions Jan. 9, 2012, May 16, 2012.
U.S. Appl. No. 13,171,489, filed Jun. 29, 2011, Ramberg, Layered Structures.
U.S. Appl. No. 13/152,273, filed Jun. 3, 2011, Ramberg, Porous Bodies and Methods, Office Actions Aug. 12, 2011.
U.S. Appl. No. 13/152,275, filed Jun. 3, 2011, Ramberg, Porous Bodies and Methods, Office Actions Aug. 12, 2011.
U.S. Appl. No. 13/316,534, filed Dec. 11, 2011, Ramberg, Porous Bodies and Methods, Office Actions Jan. 26, 2012, Apr. 26, 2012.
U.S. Appl. No. 13/327,300, filed Jan. 25, 2012, Ramberg, Porous Bodies and Methods, Office Actions Jan. 25, 2012, May 3, 2012.
U.S. Appl. No. 12/699,736, filed Feb. 3, 2010, Ramberg, Porous Bodies and Methods, Office Actions Oct. 20, 2011 Feb. 13, 2012, May 14, 2012.
U.S. Appl. No. 12/671,825, filed Aug. 9, 2010, Ramberg, Porous Bodies and Methods, Office Actions Jan. 20, 2011; Jun. 13, 2011, Dec. 9, 2011, Jun. 25, 2012.
U.S. Appl. No. 12/183,917, filed Jul. 31, 2008, Ramberg, Porous Bodies and Methods, Office Actions Dec. 21, 2010.
"Flow in Microporous Silicon Carbide: an Experimental and Numerical Study" K. Gjendal & H.B. Madsen, M.S. Thesis, DTU (Denmark) Dec. 1, 2008.
U.S. Appl. No. 12/671,825, filed Aug. 9, 2010, Ramberg, Porous Bodies and Methods.
U.S. Appl. No. 12/756,987, filed Apr. 8, 2010, Ramberg, Substrate Fabrication.
U.S. Appl. No. 12/699,736, filed Feb. 3, 2010, Ramberg, Porous Bodies and Methods.
U.S. Appl. No. 12/824,070, filed Jun. 25, 2010, Ramberg, Powertrain Controls.
U.S. Appl. No. 12/183,917, filed Jul. 31, 2008, Ramberg, Porous Bodies and Methods.
U.S. Appl. No. 13/316,534, filed Dec. 11, 2011, Ramberg, Porous Bodies and Methods.
U.S. Appl. No. 13/327,300, filed Dec. 15, 2011, Ramberg, Porous Bodies and Methods.
U.S. Appl. No. 13/343,713, filed Jan. 5, 2012, Ramberg, Aerodynamic Aftertreatment.
U.S. Appl. No. 13/494,073, filed Jun. 12, 2012, Ramberg, Porous Bodies and Methods.
U.S. Appl. No. 13/171,489, filed Jun. 29, 2011, Ramberg, Layered Structures.
U.S. Appl. No. 13/152,273, filed Jun. 3, 2011, Ramberg, Porous Bodies and Methods.
U.S. Appl. No. 13/152,275, filed Jun. 3, 2011, Ramberg, Porous Bodies and Methods.
Office Action mailed Nov. 2, 2012 (U.S. Appl. No. 12/699,736).
Translation of EP EP 0337047 (DeBoodt, M) as provided by USPTO in Office Action mailed Nov. 2, 2012 (U.S. Appl. No. 12/699,736).
Office Action mailed Sep. 13, 2012 (U.S. Appl. No. 13/494,073).
Office Action mailed Sep. 4, 2012 (U.S. Appl. No. 13/327,300).

* cited by examiner

POROUS BODIES AND METHODS

CROSS REFERENCE TO RELATED APPLICATIONS

This description is the National Stage and claims the priority benefit of international patent application number PCT/US08/71973, filed Jul. 31, 2008 and entitled "Porous Bodies and Methods," which claims the priority benefit of U.S. Provisional Patent Application No. 60/963,088, filed Aug. 3, 2007, the disclosures of which are incorporated herein by reference.

BACKGROUND

1. Technical Field

The present invention relates generally to reacting a fluid with a body, and more particularly to a body for reacting with a fluid.

2. Description of Related Art

Fluids (e.g., gases, liquids and the like) may be passed over or through a variety of substances in order to facilitate a reaction. The reaction of species in the fluid, the removal of species from the fluid, and the conversion of the fluid in some chemical or physical fashion may be enhanced by contacting the fluid with a suitable body. In some cases, reactions occur at the interface between the fluid and a surface of the body, and in such cases, it may be advantageous to maximize this surface area (e.g., by using a porous body). Reactions between a fluid and a body may also be used to modify the body itself.

Many suitable bodies are substantially porous (e.g., over 5%, 10%, 20%, 40%, 60%, 80%, or even over 90% porous). Porosity may be continuous, and in such cases, the fluid may substantially saturate the body. When pushed by a suitable driving force (e.g., pressure, voltage, magnetic field or other gradient in thermodynamic potential) a fluid may be caused to pass through the body. In some cases, a species may be removed from a fluid by passing the fluid through pores that block the passage of the species (e.g., filtration). In other cases, a species may be removed or reacted to form another species (e.g., in heterogeneous catalysis) and/or combine with the body per se (e.g., gettering). A species may also be substantially adsorbed or absorbed by the body.

Many bodies have been fabricated by choosing relatively pure starting materials and mixing them, and increasingly complex bodies require the addition of more starting materials. For example, a catalytic converter substrate may be required to have certain thermal, mechanical, and surface area properties, so might be made of cordierite ($Mg_2Al_4Si_5O_{18}$), which may be made by mixing MgO, Al2O3 and SiO2 starting materials. Cordierite containing iron $(Mg,Fe)_2Al_4Si_5O_{18}$ may have some improved properties, and might be made by adding FeO or $Fe_2O_3$ to the aforementioned mixture. Sintering aids, grain boundary phases, and catalytic species could be similarly added, and improvements to many materials generally entail the addition of further components.

Many useful bodies, particularly bodies for high temperature applications, include several components, and in some cases, additional components may improve properties. For example, mullite ($3Al_2O_3$-$2SiO_2$) materials often have high strength at fairly high temperatures (e.g., 1300 C), and U.S. Pat. No. 3,954,672 identifies certain cordierite-mullite compositions (i.e., of increased complexity) that have some improved properties over mullite. As such, materials having generally improved properties in an application may often be more complex than known materials typically used in the application.

Many useful bodies are fabricated from combinations of $SiO_2$, $Al_2O_3$, FeO, MgO, CaO, $TiO_2$ and other materials, and often include one or more useful phases (e.g, mullite, cordierite, spinels, perovskites, amorphous), each of which may include several components. Thus, the discovery of improved bodies for a variety of applications might be enhanced by basing those bodies on compositions known to have useful properties, then increasing complexity around these compositions.

Porous bodies may be used for filtration, including without limitation deep bed filtration, wall flow filtration, cake filtration, and other methods. Generally, an appropriate body for use in filtration may be chosen based upon a variety of factors, including required flow rates, viscosity of the fluid, phase assemblage of the fluid (e.g., suspended solids in a liquid, emulsions), concentration of species (to be treated) in the fluid, desired pressure differential (if pressure is driving the fluid through/past a body), temperature of the application, chemical reactivity (or lack thereof) and other factors. Available geometrical and mass constraints may also determine an appropriate filtration method. For example, large "ponds" of deep bed filtration bodies may be used to filter large amounts of wastewater, whereas catalytic removal of contaminants in an automotive exhaust gas stream may require a small, portable body.

In some applications, the mechanical behavior of the body may be important. Often, the driving force used to cause a fluid to pass through or past a body creates a mechanical stress in the body itself, and the body's resistance to this mechanical stress is a requirement in many applications. Some applications require that a body have sufficient mechanical strength to withstand an applied pressure exerted by the fluid (e.g., in a filter). Some applications may require a low thermal expansion coefficient (CTE), good thermal shock resistance, or good thermal shock damage resistance.

In many applications, channels or other substantially "open" regions of the body (offering minimal impedance to fluid flow) are used to substantially increase area for reaction or filtration (for example, as in U.S. Pat. Nos. 4,253,992 and 4,276,071). In such applications, relatively thin walls separate regions having substantially minimal impedance to fluid flow. Walls separating the channels should have both high porosity to maximize surface area or permeability, but not so high porosity that mechanical properties are degraded, and the pore size distribution should provide for the desired treatment (e.g., actually filter the species being removed).

In some applications (e.g., a filter bed) a body may be essentially hydrostatically supported during operation, and so require little mechanical strength (e.g., shear or tensile strength) during filtration. Some applications also include backwashing, which often creates a different mechanical stress than that created during filtration. In such instances, some mechanical strength or appropriate containment may be necessary. Thermal stresses, thermal expansion mismatch, changes in crystallographic structure, physical impact, and other factors may also create certain requirements of a body in a given application.

Increasingly, cost may be an important factor in a given application. Costs may include capital costs associated with fabricating the body and associated fluid control system itself. Cost may also include operational costs. Costs may also include disposal costs, environmental costs, "cradle to grave" costs and other costs associated with implementing a particular treatment solution. The energy required to create and implement a particular body may be an important cost factor, and in such cases, reducing the energy required to make and use a particular device may be advantageous. Cost may include a cost associated with emitting global warming gases, environmental pollutants, or other contaminants. Often, minimizing the embodied energy associated with a product (e.g., the energy required to create and implement the product) and/or minimizing a total lifecycle cost of the product may be advantageous. The implementation associated with a treatment method, the method of treating the fluid with the body, the disposal of treated substances and/or the body itself, and other lifecycle costs may generally include both capital costs (including raw materials costs), operational costs (including lifetime) and disposal/recycling costs.

SUMMARY OF THE INVENTION

Systems and methods for treating a fluid with a body are disclosed. Various aspects involve treating a fluid with a porous body. Certain aspects include a system for reacting fluid with a body. The system includes a container having an inlet and an outlet, and a body within the container comprised of ash particles. The body may have sufficient porosity that the fluid reacts with the body during passage from the inlet to the outlet (i.e., through the container). In some cases, the body may be disposed in the container such that the first fluid must pass through the body during passage from the inlet to the outlet, and a pore size distribution and a pore connectivity may be configured to allow the first fluid to pass through the portion of the body so disposed. Some bodies may be filters. Various bodies include catalysts to increase a rate of a chemical reaction. Some bodies have porosity ranging from 4 to 98%. Some bodies include channels, through which a fluid may pass substantially unimpeded. Some channels may pass completely through the body (e.g., from a first side of the body near the inlet to a second side of the body near the outlet).

Porosity may include a pore size distribution, and may at least partially result from the removal of a fugitive phase. A fugitive phase may be provided intrinsically, as a residue associated with an ash source. A fugitive phase may be added separately. Some bodies comprise loose particles. Other bodies include bonded particles, and in some cases, bonding includes necks between particles. Necks may be formed from cementitious bonding, which may include hydration reactions among oxide components (e.g., Ca, Si, P, Mg, Fe, Al, and other oxides), and may include the formation of $C_3S$, $C_2S$, $C_3A$, $C_4AF$, phosphates and/or gypsum phases. Neck formation may include sintering and/or other high temperature reactions.

Methods provide for using various bodies to treat a fluid. In some cases, a fluid may be an exhaust gas, which may include substances such as hydrocarbons, NOx, CO, Hg, sulfur species, and/or particulate matter. Liquids, including liquid metals, may be filtered.

Various methods include selecting an application for which a porous body is required, selecting an ash source with which to fabricate the body, and forming the ash source into a porous body for the application. One or more subsets of various particle size distributions may be selected. Certain embodiments include filter beds comprised of ash particles.

Matching an ash source to an application may include the determination of an application vector describing the application, calculating a target body vector that describes an appropriate body for the application, selecting a source material (which may include an ash source), calculating a body vector based on the source material, and comparing the calculated body vector to the target body vector. In some cases, various parameters are adjusted iteratively until the calculated and target body vectors achieve a quality of matching or fitting to each other. Body parameters and application parameters may be adjusted.

DETAILED DESCRIPTION OF THE INVENTION

Figure 1:
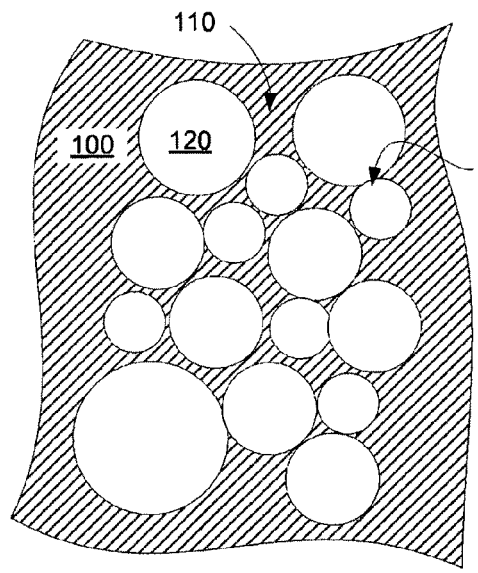
FIG. 1 is a diagrammatic representation of an exemplary embodiment.

A fluid may be treated with a porous body. In select implementations, a body comprises ash particles, and the ash particles used to form the body may be selected based on their providing one or more desired properties for a given treatment. Treatment typically occurs in the context of an application or process directed toward interacting a fluid and the body. Fluids may refer to gases, liquids, and mixtures thereof. Fluids may include several components, and in some cases, a fluid includes discrete solid and/or liquid phases (e.g., a smoke or mist). A treatment or application may include the reaction, removal, and/or transformation of a substance or species in the fluid and/or the body. The substance or species may be a solid, a liquid, a gas, a solute or even the fluid itself. Ash particles generally include substantially inorganic species, often resulting from a high temperature process. Generally, ash particles may be associated with (e.g., resulting from) a combustion process, and so may include oxides. Body generally refers to an object comprised of a plurality of particles. A body may include objects that were fabricated from particles, notwithstanding that the body (post-fabrication) may not be considered "particulate" per se. Porous generally describes a body having at least some (e.g., greater than 1%) porosity. Various embodiments include identifying a body that has appropriate characteristics for an application, and in some cases, a body may be fabricated from low cost materials.

Given an application in which a fluid is passed through or over a porous body to effect a reaction or removal of a substance or species, a variety of references exist with which a user may determine a set of desired characteristics of the body. Exemplary texts include *Rules of Thumb for Chemical Engineers* (C. R. Branan, Gulf Professional Publishing), *Perry's Chemical Engineer's Handbook* (D. W. Green & R. H. Perry, McGraw-Hill; *Transport Phenomena* (Bird, Stewart & Lightfoot, Wiley). Application characteristics such as desired flow rate, fluid composition, geometry of an interaction system, pressure drop and the like may be used to define an application vector that may include desirable properties of a body for that application. This vector may be a target, toward which a body having a set of body characteristics may be directed. Various models may be used to calculate macroscopic body characteristics using microscopic parameters such as particle size, porosity, density and pore size distribution. Similarly, references teaching the enhancement of chemical reactions (e.g. catalysis on the surfaces of the body) may be used to provide for desired chemical reactions in a given application, and other references may teach processing methods (to make the body), ways to improve mechanical properties, methods to clean, and the like. Many reactions may be enabled by a catalyst, and an appropriate catalyst choice may be an effective way to use a "generic" substrate for a wide range of reactions by choosing a catalyst or catalytic condition appropriate for the reaction and incorporating it into, onto or with the substrate.

Some reactions involving a fluid and a porous body may entail immersing the body in the fluid and allowing for reaction via diffusion into the body or passage over a surface of the body. A stream of fluid may be passed over, around, among members of, or through a body, and a body may be a solid, a powder, a fluidized bed, or other set of particles. Some bodies may be substantially solid, such as a catalytic converter substrate. Other bodies may be mechanically weak, such as a fluidized bed, and may be disposed in a container and/or with suitable packaging. Some bodies may be formed in-situ, such as a so-called cake layer formed by the deposition of material on a "sub filter" substrate during passage of the fluid. In such cases, filtration may improve with time as filtration increasingly results from filtration through the cake layer.

Treatment may include cold temperatures (e.g., 77 K or below), moderate temperatures (e.g., room temperature), high temperatures (e.g., above 700 C, 1000 C, 1300 C, or even 1600 C) and temperatures in between. Reactions may include filtration, conversion of one or more species, gas adsorption, desulfurization, de-NOx reactions, removal of hydrocarbons, Hg, CO, and other chemical reactions. Treatment may include the removal of particles or particulates from the fluid, including the removal of soot particles from an exhaust stream, or the removal of contaminants from a liquid metal. Treatment may include water purification. In some applications, treatment includes an interaction between a fluid and a body for the purpose of modifying the body, rather than the fluid.

Bodies and/or fluids may include means to catalyze a reaction. Such means can include a catalyst disposed on a surface of the body, surfaces of the particles, in the fluid, a particular surface treatment or condition associated with the body, and/or combinations thereof. Catalysts may include Group VIII metals, Pt-group metals, rare earth oxides, oxides of Fe, Ni, Co, Mn, Cr, W, Mo, V, Nb, Ta, Re, Cu and mixtures thereof. For example, it may be advantageous to catalyze the decomposition of NOx, the combustion of CO and/or hydrocarbons, the combustion of soot particulates, and other high temperature gas phase reactions by choosing an appropriate catalyst. Catalysts may include Ce, Zr, Ti, Ba, Sr, Ca and/or oxides thereof, including zeolites and mesoporous materials. Catalysts may include sulfides, particularly transition metal or rare earth sulfides. Catalysts may include heterogeneous or homogeneous catalysts. In some aspects, catalysts are organic and/or organometallic. Wash coating a catalyst may be used to apply a catalyst to a body. A catalyst may also be dispersed or dissolved in a fluid and deposited on the body by filtering the catalyst from the fluid with the body. In some aspects, a catalyst is added to the fluid being treated.

An application may have a plurality of characteristics defining chemical, physical, thermal, temporal and other characteristics of the application. Typical characteristics include a fluid to be treated, viscosity, a substance to be reacted or removed, temperature, pressure, flow rate, chemical reactivity requirements (both enhancing desired reaction and preventing undesired reactions), lifetime, and factors such as physical plant requirements (e.g., mass, size, density, shape, resistance to damage) of the porous body and associated components themselves. For a given application, an application vector describing various important factors may be created. An application vector might include input descriptors (e.g., the fluid to be treated) and output descriptors (e.g., a maximum concentration of a species in the treated fluid). Various components contributing to cost of the application may also be included, such as raw materials cost, fabrication cost, installation cost, replacement cost, process cost, and disposal cost. Certain characteristics may be particularly important with respect to a particular application. Size and weight may be more important for a mobile application than for a stationary application. Lifetime may be more important for a remote application than for an easily accessible application. "Fault tolerance" or "failsafe" requirements may be more important for an application in which failure is intolerable (e.g., a backup electrical generator at a hospital or data center), but less so when failure has modest consequences. Knowledge of an application may be captured in an application vector, and may be used to identify preferred values for a body used in the application.

Given an application vector or other descriptor of an application, a target body vector may be determined, which describes the desired features of a body to be used in the application. Exemplary features include macroscopic features (size, weight, surface area, permeability, coefficient of thermal expansion, moduli, heat capacity, thermal conductivity), microscopic features (porosity, pore shape, pore size distribution), chemical reactivity, catalytic requirements, and other factors. In some aspects, a diverse set of source materials and processing conditions are evaluated, a body vector is calculated for each member of the set, and the body vectors are compared to a target body vector for an application to find a preferred body vector. Experimental data may be incorporated into evaluation. In some aspects, the composition, phase assemblage, and particle size distribution of an ash source may be used to associate an ash source with desired properties of a body, and by extension, with an application.

For example, treatment of diesel exhaust may be characterized in terms of an application vector comprising flow rates, temperatures, maximum backpressure, lifetime, and other factors. A diesel particulate filter may comprise a porous body having a body vector (e.g., size, weight, permeability, temperature range) that provides for the body's use in the application. In some aspects, components of the body (e.g., composition, particle size, forming method) may be used to calculate a body vector, and a calculated body vector may be matched to a target body vector (from the application). Thus, a diesel particulate filter application may require a body having a certain permeability, which may be used to calculate a combination of physical factors (e.g., wall thickness) and porosity (e.g., 40-70% porosity, a pore size distribution spanning 10-40 microns, and a mean pore size of 25 microns) expected to provide for an appropriate body. By incorporating source particle data (e.g., particle sizes) and particle packing models, a hypothetical porosity, pore size distribution and mean pore size may be calculated. By changing input parameters (e.g., amounts of different particle sizes), the calculated porosity may be iterated toward the target porosity. Various hypothetical compositions may be used as experimental starting points for fabricating bodies.

Ash sources may be diverse in chemical composition, phase assemblage, LOI (loss on ignition), particle size, and other factors. Ash particles may range from below 100 nm to above 1 cm in size. In select aspects, ash particles range from about 1 micron to about 70 microns in size. In some cases, larger ash particles (e.g., above 20 microns) may be used to incorporate larger pore sizes, and smaller ash particles (e.g., below 5 microns) may be used to incorporate smaller pore sizes. In certain cases, a body contains regions having different sized particles, and each region provides a complementary feature. In some examples, a first region provides structural properties and a second region provides fluid treatment properties. In certain embodiments, small particles provide fluid treatment properties, and larger particles support the smaller particles. Various embodiments include first particles providing mechanical properties and second particles providing high surface area (e.g., over 30 m^2/g).

In many cases, ash particles may also include a substantial amount (e.g., greater than 1%, 10%, 30%, 40%, 50%, or even greater than 60%) of an organic or other carbonaceous species. Many combustion processes do not result in complete combustion of the fuel source, and so resulting ash particles may be associated with one or more "partially combusted" or "uncombusted" organic species. For many ash materials, the relative percentage of inorganic to carbonaceous species may be characterized using LOI, corresponding approximately to the amount of carbonacous species removed from the as-produced ash material during a subsequent complete firing of the material in an oxidative atmosphere. Exemplary types of ash particles may include fly ash, waste incinerator ash, bottom ash, volcanic ash, coal gasification ash, combustion ash, ash from biomass combustion or gasification, ash from metallurgical processes, slags and other ashes. Ash particles may generally be any shape, including but not limited to spherical, spheroidal, angular, platelike, whisker, hollow, cenospheric, fibrous, and other shapes. Ash particles may comprise Class C fly ash, Class F fly ash, and other classes of fly ash.

Ash particles may be obtained from a variety of sources, and the composition of the particles is generally a function of the process (and inputs to that process) used to create the ash particles. For example, the combustion of municipal solid waste may create ash particles having compositions associated with that particular waste stream (e.g., household garbage, waste paper, sewage solids, and the like). Coal combustion may produce a variety of ash sources, including fly ash, bottom ash, boiler slag, flue gas desulfurization ash, gasification ash, and fluidized bed combustion ash. Ashes resulting from combustion may be characterized by the fuel source, particularly the chemical composition (e.g., sulfur content), geographical location of the source (e.g., Powder River Basin, Wyoming), coal quality (e.g., lignite, subbituminous, bituminous), and other factors. Ashes may be characterized by their respective combustion conditions (e.g., temperature, oxygen partial pressure). Ashes may be characterized by particle size distribution, chemical composition, crystalline and/or amorphous structure, reactivity, LOI, and the like.

Some ash sources from a single combustor and fuel source may include a variety of diverse compositions and phases. For example, Gottschalk et. al. describe ash containing hollow cenospheres, spheroidal magnetite particles, silicates, various carbonaceous species, and particles of various shapes, in addition to a range of particle sizes (*Ceram. Trans.* [119] (2001) 125-134). Other ash sources may be fairly homogeneous. Ash particles having a diverse range of properties may be obtained, due to the broad range of processes and inputs creating ash particles worldwide. Much as the petrochemical industry integrates varying supplies and qualities of a raw material (e.g., crude oil) into output products meeting a standardized set of requirements (e.g., gasoline), various embodiments entail obtaining, evaluating, selecting, and optionally modifying diverse ash sources, selecting one or more subsets of the sources, forming the selected ash into bodies, and testing properties to determine a fit for a selected application.

Ashes may include one or more phases having one or more components. Some ashes may be substantially crystalline; some ashes may be substantially amorphous; some particles may be hollow. Ash particles may be magnetic. Many sources of ash are relatively low cost. In some cases, ash particles must be otherwise disposed of (if not used in a subsequent application), and so the utilization of ash particles (e.g., in an application as described herein) may reduce disposal costs. Particles may be characterized by a particle shape (or shapes), particle size distribution, and interparticle connectivity (e.g., in the body).

A body may be formed, packaged or otherwise contained in a fashion such that the fluid may be exposed to the body in a controlled manner. A body may have mechanical integrity (e.g., strength, elastic response) sufficient to meet structural requirements of an application. In some embodiments, a body has a tensile strength above 1 MPa, preferably above 10 MPa, and more preferably above 100 MPa. A body may include a deep bed of particles, a fixed bed, a fluidized bed, or another assemblage of particles. Some bodies include a shear strength above 1 kPa, and preferably above 10 kPa.

Porosity may refer to closed porosity and/or open porosity. Porosity may be characterized by a pore size distribution, mean pore size, median pore size, pore shape, pore connectivity, and other "pore-scale" factors. Porosity in the body may also be characterized with various macroscopic factors such as % porosity (e.g., as compared to a dense body of similar composition), permeability, permeation values, surface area, and the like.

An application may entail the use of a force during treatment (e.g., a magnetic field that stabilizes or aligns a body comprising magnetic particles). Certain aspects include bodies that have low porosity (e.g., less than 10%, 5%, 2%) porosity. Other aspects include bodies having moderate porosity (e.g., between 10 and 60%). Some embodiments may have high porosity (e.g., above 60%, above 70%, above 80%, or even above 90%). Various embodiments include bodies having open porosity between 20 and 80%, and certain aspects incorporate substantially open regions or channels or paths, whose incorporation may result in overall densities much lower than (e.g., 10%, 1%, or even below 0.1% of) a body not having such regions. Relationships between macroscopic factors such as permeability and microscopic factors such as pore size may be calculated. Pore size distribution may be predicted from a particle size distribution (optionally with particle shape data) using standard models for particle packing or using references teaching such relationships. Often, a first characteristic may be calculated, or at least inferred, from a second characteristic. Such data may be used to choose an appropriate ash source from which to fabricate a body for a particular application. Various embodiments may be characterized by a specific surface area, and in some cases, a specific surface area may be greater than 10, 100, 1000, 10,000, 100,000, or even 1E6 square inches per gram. Certain embodiments include pores greater than 5 microns in size, and these pores comprise between 0.1 and 0.8 cm^/g of a body. A preferred implementation includes a coefficient of thermal expansion below 8E-6/° C., preferably below 4E-6/° C., and more preferably below 2E-6/° C.

Often, porosity characteristics must be optimized among conflicting requirements, such as permeation rate vs. mechanical properties. Additionally, some processes used to form a body (such as molding, extrusion, slip casting, gel casting, doctor blading, and other forming operations) require input pastes, slips, or materials having specific viscoelastic properties, which are often affected by the particle sized distribution of the associated ash particles and/or an organic binder (which may also affect porosity).

In some embodiments, porosity may be controlled via the use of an appropriate particle size distribution, which may include the use of surfactants, stabilizers, stearic moieties (e.g. lipids) and other compounds that affect or control the interparticle spacing and/or arrangement. Porosity may be controlled by using diverse sets of controlled particle sizes. Porosity may be controlled by a forming operation, such as an applied pressure, a sintering process, or an etching process. In certain aspects, porosity is at least partially controlled via the introduction of a fugitive phase during forming, which generally affects the particles during a molding or forming process. Subsequent to molding, the fugitive phase may be removed, leaving the desired porosity trait.

A fugitive phase may include organic (e.g., hydrocarbons, carbohydrates, graphite) and/or inorganic materials (e.g., ice). A fugitive phase may be included as discrete particles, as a substantially continuous phase, or as a coating or other adherent phase associated with the particles. A fugitive phase may be a component of the ash particles as produced by the process yielding the ash (e.g., the residual soot or carbonaceous species associated with some fly ashes). A fugitive phase may be added separately. Representative fugitive phases include carbon black, starches, and polymers (including polyethylene, polystyrene, polyamides, PET, Polylactic acid, polyvinyl alcohol, and others). Whiskers, fibers, platelets and other anisotropic shapes may also be used as fugitive phases. In some aspects, a fugitive phase may include particles ranging from 10 nm-500 microns in size, and some embodiments include fugitive phase ranging from 100 nm to 100 microns in size. Exemplary fugitive phases include graphite particles between 44 and 200 microns, graphite particles below 44 microns, and carbon black having mean particle sizes between 100 nm and 3 microns. Certain embodiments include large (e.g., >1 mm or even >1 cm) fugitive phases. Fugitive phases may include cellulose, charcoal, coal and other species. Various organic additives used to control rheology, forming, demolding, and other formation aspects may also be fugitive phases.

Removal of a fugitive phase may include combustion. In certain aspects, heat resulting from this combustion may be used to enhance a firing or other processing step. Gas flow through the body may be used to control the combustion of a fugitive phase.

For many applications, a particular ash may provide a "pre-mixed" raw materials source having a desirable composition. Thus, a cordierite body might be fabricated by choosing an ash already having at least some (and preferably most) of the elements necessary for forming cordierite. Certain embodiments include matching an ash source, a forming process and an application requiring a body, such that a body formed from the ash source according to the process may be appropriate for the application.

Ash particles may include substantial amounts of SiO2 and Al2O3. Some ashes may also include substantial amounts of Fe species, and other some ashes often include Ca, Mg, and other materials. Typically, these species are present as oxides. Often, ash particles will include mixed oxides and/or mixed phases, which are readily identifiable through a combination of chemical (e.g. energy dispersive spectroscopy, x-ray fluorescence, plasma-optical emission spectroscopy, etc.) and physical (x-ray diffraction, particle size analysis, particle shape analysis) methods. In some aspects, an ash having a composition that might be inappropriate for a first application is an excellent choice for a second application. For illustrative purposes, and without intending to limit to any particular ash source or application, Table 1 lists several ash source compositions, along with comparable compositions of several useful materials.

TABLE 1

Chemical Compositions of Certain Ashes and Certain Ceramics

| Composition | wt % SiO2 | wt % Al2O3 | wt % MgO | wt % Fe2O3 | wt % CaO | Reference |
|---|---|---|---|---|---|---|
| Cordierite 2MgO-2Al2O3-5SiO2 | 51 | 35 | 14-x | x | | |
| Elk Creek (WV) bituminous ash | 57 | 30 | 1 | 6.7 | 1 | [1] |
| Pulverized Ohio 5/6/7 blend ash | 38 | 39 | 1 | 13 | 2 | [2] |
| Wyodak PRB coal ash | 43 | 17 | 4 | 6 | 23 | [2] |
| 3,954,672 Composition B | 47 | 33 | 13 | 1 | | [3] |
| 3,954,672 Composition C | 43 | 39 | 11 | 1 | | [3] |
| 3,954,672 Composition E | 40 | 44 | 11 | 1 | | [3] |
| MSW Incinerator Ash | 18 | 9 | 3 | 2 | 19 | [4] |
| Mullite 3Al2O3-2SiO2 | 28 | 72 | | | | |
| Spinel MgAl2O4 | | 72 | 28 | | | |

1: Jung & Schobert, Energy & Fuels (1992)[6], 59-68.
2: Seames, Fuel Processing Technology (2003) 109-125.
3: U.S. Pat. No. 3,954,672
4: Cheng et al., Ceram Int'l. (2002) 779-783.

For example, the composition of the Elk Creek bituminous coal ash in Table 1 is relatively close to the composition of cordierite, and particularly close to a cordierite that is doped with Fe. This ash could be a suitable choice upon which to base an Fe-doped cordierite material. By starting with Elk Creek bituminous ash from Table 1, then adding approximately 8 wt % Al2O3 and 8 wt % MgO, a renormalized composition of 51% SiO2, 34% Al2O3, 8% MgO and 7% Fe2O3 may result, which is close to a composition of Fe-doped cordierite Similarly, Wyodak PRB coal ash may be a useful material from which to form Gehlenite (2Ca—O—Al2O3-SiO2), and several ash compositions are close to mullite-cordierite compositions of bodies having advantageous properties (shown as compositions B, C, and E in Table 1).

Certain embodiments include a database of ash properties, forming processes, and methods to calculate body vectors based thereon. An ash source may be matched to a desired application based on a probability or other figure of merit describing the likelihood that the ash source can be developed into a body for that application.

Certain aspects include matching a source of particles to a desired application. For example, a first direct-injection engine may use low pressure injections of larger fuel volumes, and create large amounts of soot particles in the "PM10" regime (i.e., approximately 10 microns), which may require a certain size porosity for its removal, which may be created using a first particle size distribution and/or first fugitive phase. A second direct-injection engine may use higher injection pressures, multiple small injections, and even a lower molecular weight fuel (e.g., gasoline). This second engine may create smaller particles, many of which may be below 2.5 microns (e.g., PM2.5), and their removal may require a body having finer porosity than for the first engine. A second particle size distribution, size cut, fugitive phase, forming method or other factor may be used to create this finer porosity. Various embodiments include systems and methods for high throughput experiments directed toward synthesizing a plurality of samples containing different source materials and screening them for properties associated with an application, often based upon a vector of requirements associated with that application.

Various methods may be used to calculate and/or estimate the properties of a body, including experimental measurements. Optimization methods (e.g., least squares, monte carlo, steepest descent, parallel tempering) may be used to find a body vector that matches an application vector. For a given ash source, data such as composition, particle size distribution, particle shape, LOI, and crystal structure (or assemblage thereof) may be combined with thermal data (differential thermal analysis, dilatometry (DTA), thermogravimetric analysis (TGA), differential scanning calorimetry (DSC)) to predict the behavior of the ash during and subsequent to a forming operation. Some embodiments create parameter vectors describing materials source properties and forming data to estimate body vectors for hypothetical bodies. These data may be combined with models describing fluid flow and fluid interactions with the body to predict the properties of a body based on a particular ash source (optionally subject to a particular forming process such as molding, firing, burnout, etc.). These body vectors may be matched to one or more application vectors to evaluate fit, and in some cases, adjustable parameters in the body vector inputs are iteratively optimized in order to better match a body vector to an application vector. The application vector may also be iteratively modified with the body vector in a calculation that best matches an ash source, a processing method, a set of geometrical and other constraints and other factors to a set of application constraints.

Exemplary ash sources, particle sizes, phases, compositions, and other ash properties are disclosed herein for illustrative purposes. Similarly, properties of various bodies such as shape, size, thermal characteristics, permeability, porosity, density and the like are for illustrative purposes. Applications such as liquid metal filtration, exhaust gas mitigation, flue gas purification, water treatment, diesel or direct-injection particulate removal, the catalytic removal of species (e.g., NOx, hydrocarbons, CO and other species), mercury removal, sulfur removal and the like are for illustrative purposes.

Select aspects include computing devices, networking components, databases, storage, servers and the like, generally including at least a processor, memory, storage media, input, output, display, communications circuitry, and a database comprising ash data, materials properties, matching methods, forming data, and application data. Certain embodiments include a computer-readable storage medium having embodied thereon a program operable by a processor to perform a method. Certain methods include selecting an application for which a body is needed and determining an ash source and optionally processing parameters that should yield the desired body. Bodies may be fabricated, measured, and the measured properties may be compared with predicted properties.

Many industrial-scale combustion processes (e.g., electricity generation, industrial heating, coal combustion, municipal solid waste incineration and the like) are regulated by governments, and so lists of ash sources are readily available. For example, the state of Pennsylvania in the United States currently includes over twenty coal fired power plants, ranging from the New Castle and Bruce Mansfield plants in the western part of the state, to the Portland, Martins Creek and Eddystroke plants in the eastern part of the state. The United States obtains over 50% of its energy from coal, and many other countries produce significant quantities of coal fly ash, waste incineration ash, or both. As such, there is a large supply of ash in many countries, the magnitude of which provides for both a wide range of ash compositions and a substantial amount of each particular composition. Ash products may be available with particle sizes ranging from below 1 micron to above 1 mm. For some bodies, preferable ash particle size distributions may range from 0.1 microns to 100 microns, with average particle sizes in the range of 5-50 microns. In some embodiments, one or more ash sources having broad particle size distributions is identified, the ash source is sieved to create sequential "cuts" of various particle size ranges, and one or more cuts is selected. Different cuts from the same and/or different materials sources may be combined.

FIG. 1 is a diagrammatic representation of an exemplary embodiment. A fluid 100 substantially penetrates a porous body 110 comprised of ash particles 120. Generally, interactions between a fluid and body may include a container or package, containing the body, having inlet(s) and outlet(s), and configured to confine the fluid to a desired flow path. For clarity, such containers are generally omitted from figures. Ash particles may have a relatively narrow particle size distribution, a wide particle size distribution, a bimodal or multimodal particle size distribution or other distribution as desired. Ash particles may be substantially monodisperse. Particles may be connected, bonded or separate. Ash particles may come from one or more different ash sources, and in some aspects, a first size distribution is selected from a first source, and a second size distribution is selected from a second source, and the distributions are combined.

Particles may be bound to each other via interparticle bonds 130. Interparticle bonds 130 may include necks or other connective structures, or forces between particles (e.g., Van der Waals forces). Formation of interparticle bonds 130 may include the use of cementitious bonding, aqueous chemical bonding, or other relatively low temperature reactions between and/or with particles. Formation of interparticle bonds 130 may include diffusion, sintering or other higher reactions between and/or with particles. In some applications, some particles are bonded and some are not. In certain aspects, control of interparticle bonding may be used to control compliance, thermal shock resistance, thermal shock damage resistance, and other factors. Certain aspects include the addition of components that aid the formation of desired interparticle bonds 130, and in some cases, these components are different than the material of ash particles 120. In a preferred embodiment, a first ash source provides a desired permeability, and a second ash source enhances bonding. In another embodiment, a first ash source provides a desired permeability, and a second ash source enhances viscoelastic properties of a paste used to form the body.

Porosity may be characterized by factors including pore size distribution, pore connectivity, and/or pore shape. Pore connectivity and/or pore shape may be isotropic or anisotropic. In some aspects, a pore connectivity may be designed that optimizes both fluid interaction and mechanical properties. Some porosity may be anisotropic with respect to (e.g.,) various body dimensions. A pore size distribution may take a variety of forms, including Gaussian, normal, lognormal, multimodal, bimodal, trimodal, skewed, Weibull, or any other desired distribution. Porosity may also be characterized by macroscopic factors (e.g., % porosity, surface area, permeability and the like). Various applications may require different combinations of mean pore diameter and percentage open porosity.

Figure 2:
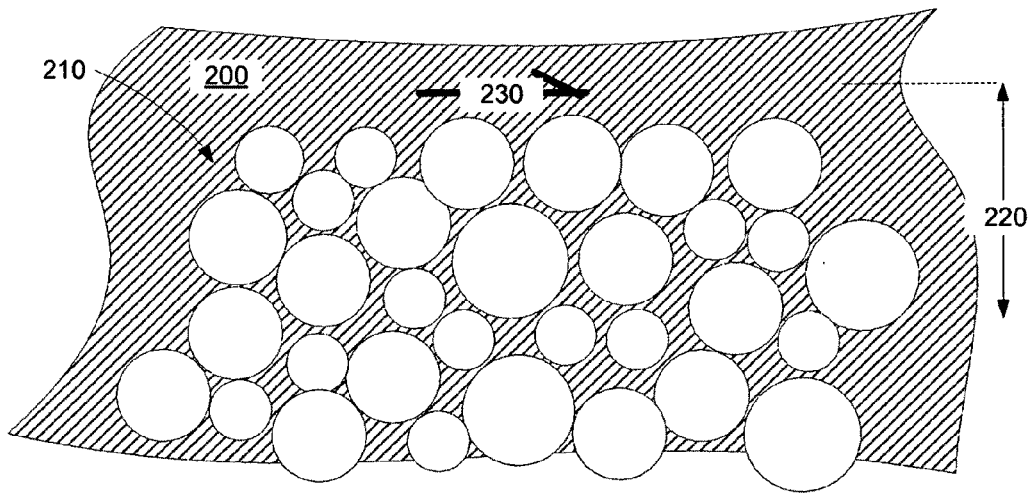
FIG. 2 is a diagrammatic representation of an exemplary embodiment.

FIG. 2 is a diagrammatic representation of an exemplary embodiment. FIG. 2 shows an application in which flowing fluid 200 interacts with porous body 210. An exemplary application may be one in which body 210 catalyzes a reaction in fluid 200. Generally, such an application may include a transition region 220, over which fluid transport may change from laminar or turbulent flow near the surface to substantially diffusive transport within the body. Various embodiments may include means to move the fluid, including pumps, fans, gravity, a pressure head, electrochemical gradients and the like. Fluid passage past the body may also be characterized by a shear force 230 at the fluid/body interface. Even when fluid 200 has a significant linear velocity past body 210, porosity of body 210 may create a broad range of local flow rates within transition region 220, generally decreasing with depth into the body. As such, a wide range of residence times, diffusive reactions and catalytic processes may be created, depending upon a depth within the body.

A reaction may include a reaction between more than one fluid and a body (e.g., a reaction involving a gas phase and a liquid phase). Various embodiments include an electrochemical or similar type of reaction (which may include ions, electrons or other species).

In some aspects, it may be advantageous to choose a pore size distribution that optimizes (e.g., maximizes subject to mechanical requirements) the surface area of the body exposed to fluid 200, and it may also be advantageous to form channels in the body that macroscopically expose a significant fraction of the body to the fluid. In certain aspects, channels may be formed by a material (e.g., a first ash source) providing structural properties, and a second material within the body (e.g., a second ash source) provides fluid treatment properties (e.g. a desired reactivity). In some aspects, bodies are composites of two, three, four, five, six, or more phases. In some embodiments, a body comprises two phases, each of which may include ash particles. A first phase may include first particles below 200 mesh and a second phase may include second particles below 0.2 microns. The second phase may have surface area greater than 20 m^2/g, and preferably greater than 100 m^2/g, and exemplary particles include transition-metal or rare earth (e.g., Mo, Ce, La, Zr) sulfides and/or oxides, and may include zeolites. In a preferred application, the first phase comprises 50-90% by mass, and the second phase comprises 10-50% by mass.

Figure 3:
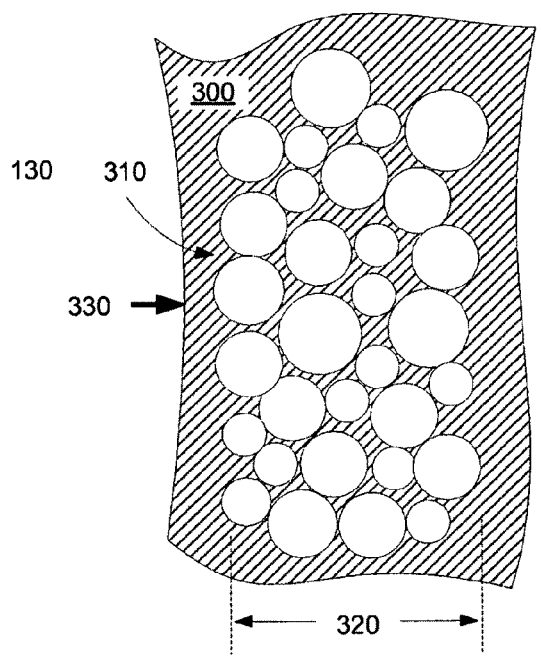
FIG. 3 is a diagrammatic representation of an exemplary embodiment.

FIG. 3 is a diagrammatic representation of an exemplary embodiment. FIG. 3 shows an application in which fluid 300 is passed through a body 310 (e.g., in filtration or sparging). Often, such applications include the removal of a species by using a porosity that allows passage of fluid 300 but substantially blocks the passage of a species entrained within fluid 300. Typically, body 310 may be characterized by one or more lengths 320. Length 320 may describe a minimum length that must be traversed by the fluid in passing through the body. The passage of fluid 300 through body 310 may be caused by a force 330. In some applications, force 330 includes a component substantially parallel to length 320, and for relatively small lengths 320 (based on the pressure associated with force 330 and the mechanical properties of body 310), body 310 should be strong enough to maintain mechanical integrity during use. Such applications may require packaging, containment, interparticle bonding or other aspects such that the body mechanically resists the pressure created by force 330 while allowing the passage of the fluid 300. In certain applications, length 320 is approximately 50-1000 microns. In other applications, length 320 is approximately 1-5 mm. In still other applications, length 320 is approximately 1 cm, and in further applications, length 320 is greater than 10 cm, and in some applications length 320 is greater than 0.1 m. In certain embodiments, length 320 is approximately 800 microns and body 310 has a median pore size between 5 and 50 microns.

Various applications may require different combinations of mean pore diameter, percentage open porosity, and length 320. Factors such as a size of a species being removed, the concentration of that species in fluid 300, a desired flow rate of fluid 300 through body 310, a strength of body 310, particularly with respect to force 330, the tendency of a reacted species to affect (e.g., clog) body 310, and other factors may be used to determine the desired properties of body 310. In some embodiments, body 310 includes a length 320 between 100 and 900 microns, fluid 300 is a gas, body 310 is removing substantially solid particulates associated with direct injection combustion. In some embodiments, a relationship between a percentage of open porosity (OP %) and a mean pore diameter (MPD, in microns) is given by: OP %=75−1.46*MPD. In some cases, OP % may vary by up to 30% above and/or below this relationship (i.e., the relationship may be a "band"). In certain embodiments, porosity may be between 30-70%, and MPD may be between 5 and 60 microns.

Figure 4:
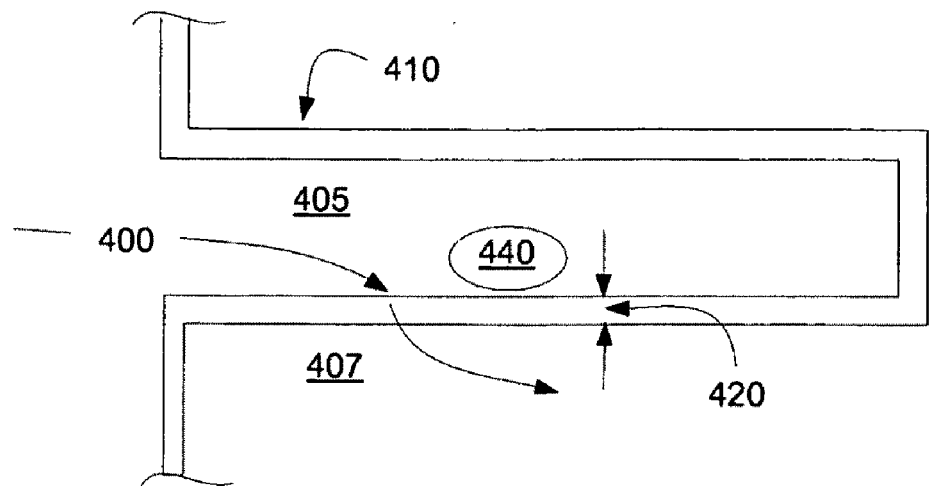
FIG. 4 provides a diagrammatic representation of a representative section of a channel embodiment.

FIG. 4 provides a diagrammatic representation of a representative section of a channel embodiment. Channels, tubes, planar passages and the like may provide for substantially unimpeded fluid flow within, while increasing exposure of the fluid to channel walls. In this example, a channel is blocked, forcing passage through the body material per se (e.g., through a wall to an adjacent channel). In other embodiments, channels are not blocked, and fluids flow freely through the body via the channels. In FIG. 4, fluid stream 400 flows into body 410 in a first direction, generally parallel to one or more channels 405 incorporated into body 410. Alternating channels 405 and 407 may be created to maximize the region of body 410 through which fluid stream 400 can pass, shown as regions having length 420. Fluid stream 400 may pass through a first channel 405 into an adjacent channel 407 via a wall (of length 420) between the channels. Body 410 may include porosity having a pore size distribution that allows passage of fluid stream 400 while blocking a substance 440 entrained in gas stream 400. In certain aspects, substance 440 may be blocked substantially "within" body 410 (e.g., within the walls). In other aspects, substance 440 may be blocked substantially at the interface between body 410 and channel 405. In certain cases, substance 440 may form a layer that affects the permeability of body 410. In some aspects, the cross sectional area of each channel (i.e., the area of a channel facing the fluid flow) is the same. In other aspects, different channels have different cross sectional areas. In embodiments in which a substantial amount of substance 440 is expected to deposit on or in channel 405, channel 405 may be made larger than adjacent channels (e.g., channel 407) such that the effective flow rates of the two channels are better matched as channel 405 "fills up" with a blocked substance 440. Channels may have a cross section that is circular, square, hexagonal, octagonal, triagonal, and/or other shapes.

Various geometric designs may be used to maximize area exposed to the fluid while increasing the "wall strength" associated with channels in a body. Many of these designs combine thin walls (e.g., small lengths 420) with regularly spaced supports that reinforce channels against pressure exerted by fluid stream 400.

Figure 5:
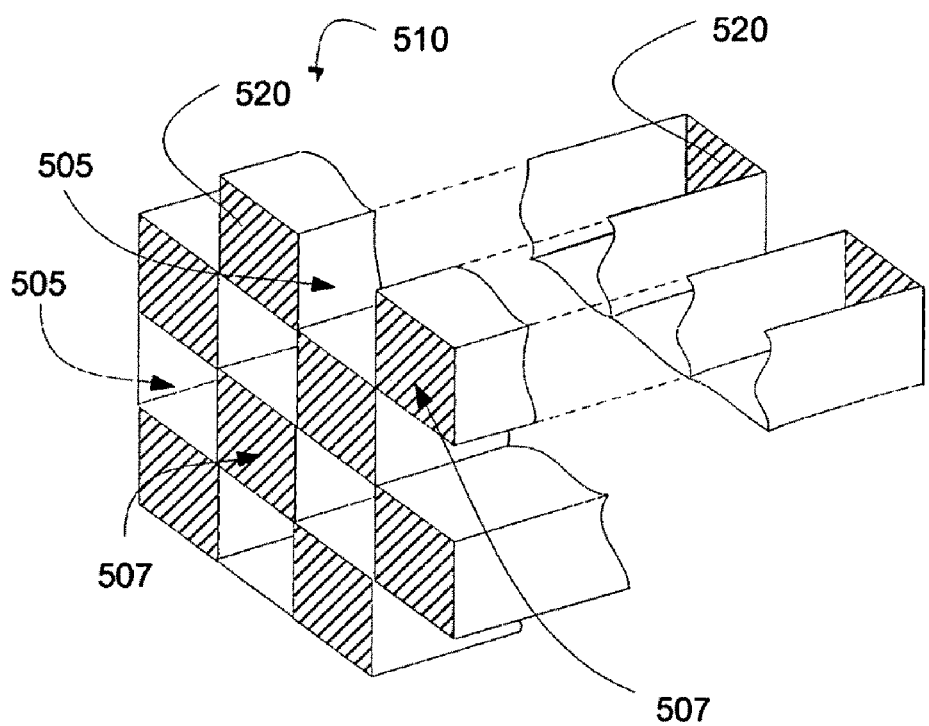
FIG. 5 is a diagrammatic representation showing an alternating channel design according to certain disclosed embodiments.

FIG. 5 is a diagrammatic representation showing an alternating channel design according to certain aspects. Body 510 may be a porous body comprised of ash particles, and may generally be contained in a container (not shown). In this example, body 510 includes alternately blocked parallel channels 505 and 507, in which channels 505 are blocked at a first side of the body, and channels 507 are blocked at a second side. Alternating channels may be blocked at opposite ends with plugs 520. Generally, channels 507 may be blocked at a first end of body 510, so a fluid passes into body 510 via channels 505. Similarly, channels 505 may be blocked at a second end, such that a fluid exits body 510 via channels 507. As such, a fluid passing through body 510 may be forced through the solid regions of the body (e.g., the walls separating channels 505 from channels 507. Characteristics (e.g., cross sectional area, length, channel dimensions, number of channels, wall thickness, permeability, operational temperature capability, thermal properties, mechanical properties, chemical properties and the like) required of a body such as body 510 are generally defined by a particular application. For example, a diesel particulate filter may include a material capable of sustained operation at over 400 degrees, cycling to over 1000 degrees, having a porosity between 30 and 60%, having a median pore size between 2 and 30 microns, have a permeability of at least $0.5E{-}12/m^2$ (preferably greater than $1E{-}12/m^2$), modulus of rupture greater than 10 Mpa (preferably above 100 MPa), and a thermal expansion coefficient less than $1E{-}5$/degree Celsius.

For applications not requiring flow through walls (e.g., a catalytic converter), plugging the ends may be unnecessary, and the channel geometry of body 510 (absent the end plugs 520) may be used to maximize a surface area available for reaction. In some aspects, it may be advantageous to incorporate porosity such that a body has a surface area greater than $1\,m^2/g$, $10\,m^2/g$, greater than $40\,m^2/g$, or even greater than $100\,m^2/g$.

Bodies may be fabricated from ash sources containing or yielding one or more desired phases, depending upon an application. Desired phases may include cordierite ($2MgO$-$2Al_2O_3$-$5SiO_2$), mullite ($3Al_2O_3$-$2SiO_2$), β-spodumene ($Li_2O$—$Al_2O_3$)$2$-$8SiO_2$, Aluminum Titanate ($Al_2TiO_5$), Aluminum Titanate-Mullite, magnetite, maghemite, spinels, garnets, wollastonites, perovskites, and other mixtures thereof. Various bodies may include Aluminum Titanate doped with $Fe_2O_3$ and/or rare earth oxides ($La_2O_3$, $Nd_2O_3$). Additional components (sintering aids, catalysts, and the like) may be added to a mixture comprising ash particles in order to modify composition as desired.

Although a body such as body 510 may be fabricated from a variety of methods, it may be advantageous to extrude body 510. In such cases, it may be advantageous to extrude a paste having non-Newtonian viscoelastic characteristics, and in some cases, it may be advantageous to use a shear-thinning paste. A variety of methods exist to adjust the rheological properties of pastes, slurries and the like, and these methods generally apply to pastes, slurries, and the like that incorporate ash particles. Admixtures (e.g., as used in cement rheology) may be added between 0.01 and 10%. Lignosulfonates and/or other lignin-containing compounds may be used, generally between 0.01 and 5%. Exemplary sources of lignosulfonates include spent sulfite liquors from cellulose processing plants. Various organic materials may also be used to modify rheology, including methylcellulose, polyvinyl alcohol (PVA), polyethylene glycol (PEG), vinyl acetate and vinyl pyrrolidone. Exemplary recipes include an ash source, a liquid carrier (e.g., water) of approximately 10-50% by weight of the ash source, a cellulose binder such as methylcellulose in the range of 1-20% by weight, and optionally a detergent and/or surfactant in the range of 0-3% by weight. Some embodiments include the addition of ethylene glycol, fatty acids, polyvinyl alcohol, and/or other organic species, generally in the range of 0-10 wt %.

In certain embodiments, a fugitive phase is used, often in the range of 10-80% by weight, in order to enhance porosity. A fugitive phase may be present in an as-received ash source, such as a fly ash having substantial residual carbonaceous species. A fugitive phase may also be added separately. Various substances added to modify forming processes (e.g., methylcellulose) may also be fugitive phases. Exemplary fugitive phases include graphite, potato starch, polyethylene particles, polyvinyl acetate particles, or other materials capable of influencing the final microstructure before being removed from the body.

In certain aspects, composition may be modified through the addition of one or more components designed to react with the ash. Such components could include, without limitation, MgO, $SiO_2$, colloidal $SiO_2$, $TiO_2$, FeO, Talc, kaolin, boehmite, various $Al_2O_3$ species (e.g, γ-$Al_2O_3$, α-$Al_2O_3$), gypsum, phosphorous-containing compounds, SiC, Al, Co, Fe, Ni, Ba, Pb, lanthanides, sulfides, zeolites, rare earth compounds and the like.

Rheological properties may be enhanced by using a multimodal particle size distribution. In certain cases, a mixture of between 30-90% of a large particle size cut (e.g., particles greater than 10, 20, 30, 40, 50 or more microns) may be combined with a complementary amount of a small particle size cut (e.g., below 10, 5, 3, 1, or 0.1 microns). In certain embodiments, a bimodal particle size distribution is used, with first and second distributions mixed in approximately equal amounts, and the second distribution having a mean particle size that is ~5-25% of the mean particle size of the first.

For extruded bodies requiring further processing (e.g., channel plugging), it may be advantageous to inject a thick paste (typically of similar composition) into channels requiring it. For bodies fabricated by assembling one or more substantially planar pieces, doctor blading or other methods to synthesize planar bodies may be used, and planar pieces may be bonded together with a paste or slip.

In some embodiments, walls associated with channels may be substantially planar. In other embodiments, walls may be curved.

Forming a body may include forming cementitious or other hydrated bonds among particles. Some ash compositions may be capable of forming cementitious bonds without additional components. In certain cases, complementary components (e.g., CaO, MgO, or other components) are added to an ash composition such that the combined composition forms substantially cementitious bonds. Some bodies may include pozzolanic materials, and some of these may include the addition of complementary materials to enable the formation of desired phases.

Some bodies may be fired. Firing may be used to remove a fugitive phase (e.g., via combustion of a carbonaceous fugitive phase). Firing may also be used to aid the formation of interparticle bonds (e.g., necks). Firing may also be used to change the composition, crystal structure, particle size, grain size, and other aspects of a body. Select embodiments include selecting a first phase for forming a body, reacting the first phase to form a second phase during a forming operation, and in some cases, forming a third phase during a firing operation.

Firing times and temperature may generally depend upon a desired application and body properties directed thereto. Generally, applications requiring more refractory bodies may require equivalently higher firing temperatures. In some aspects, bodies are fired at temperatures between 400 and 800 Celsius. Bodies may be fired at temperatures between 800 and 1200 degrees Celsius. Some bodies may be fired at temperatures between 1200 and 1800 degrees. Some bodies including cordierite may be fired at temperatures between 1000 and 1600 degrees. Some bodies including mullite may be fired at temperatures between 1000 and 1950 degrees. Bodies requiring low temperature firing may be enhanced by using ashes containing network modifiers such as $K_2O$ and $Na_2O$, or by adding these components. Bodies for use at temperatures above 500 Celsius may perform better by choosing an ash source having low (preferably negligible) amounts of less refractory materials such as $K_2O$ and $Na_2O$. Certain compositions may form a liquid phase that first enhances bonding, then reacts to form a solid phase (e.g., as in reactive sintering).

Certain aspects include firing in a coal fired, gas fired, microwave enhanced, and/or electric furnace. In some cases, firing includes controlled atmospheres, which may include oxidizing, reducing, forming gas, Nitrogen, and other atmospheres. Firing may be done in air. Some bodies do not require firing. Firing atmospheres may include the addition of a gaseous component to prevent an undesired evolution of a substance during firing (e.g., an overpressure of a gas).

Body 510 may be appropriate for filtration. By choosing a substantially inorganic ash material, particularly a composition tending to form a refractory phase such as cordierite, spinel, mullite, indialite, corundum, aluminum titanate, and/or combinations thereof, body 510 may be made refractory, and so may be useful for the filtration of hot fluids such as molten metals or hot gases. In select embodiments, a temperature of operation includes a range between 200 and 1200 degrees Celsius. In some embodiments, a body is formed having a first pore size distribution, the body is treated with a fluid containing particles that are substantially filtered by the body, the fluid is removed (leaving the particles), and the body and particles are processed (e.g., fired) to create a body having a second pore size distribution. An exemplary fluid may be air, and exemplary particles may be fine particles yielding a composition similar to (or complementary to) a composition of the body. In certain cases, the body and/or particles comprise ash particles. Some bodies include celsian phases.

In some aspects, a body may include 60-95% porosity, have an air permeability between 100 and 10,000E-7 cm^2, have between 5-70 pores per inch, and be between 0.1 and 10 inches thick.

Body 510 may be used for the filtration of particulates associated with combustion, and in some cases, body 510 may be used in an application involving diesel engine combustion. In exemplary applications, body 510 may have between 4 and 500 channels per square inch of area (orthogonal to the channels). In other embodiments, body 510 may have fewer than 5 channels per square inch, and in some cases, fewer than 0.1 channels per square inch. In certain embodiments, body 510 has more than 600, 800, or even 1000 channels per square inch. Some versions of body 510 may remove particulate matter from a diesel exhaust stream, including particulate matter characterized as PM10 and/or PM2.5 and/or other matter. In some examples, particulate matter may be reduced to a level below 1, 0.5, 0.1, 0.05, or even 0.01 g/bhp-hr, as normalized to an engine of a particular brake horsepower generating the particulate matter being removed by the body from the associated exhaust gas stream. Certain embodiments include a body for removing at least some pollutants in an engine exhaust stream to a level below that of USEPA Tier 2 Bin 10, US 2007 HD, and/or Euro V, and preferably USEPA Tier 2 Bin 5 (or even Bin 2), US2010 HD, and/or Euro VI.

In some embodiments, body 510 may have a wall thickness between about 50 microns and 2 mm, may have porosity between 10 and 90%, preferably between 20 and 80%, may have a mean pore size between 1 and 60 microns. In some aspects, body 510 may have a median pore size between 4 and 22 microns. In certain embodiments body 510 is characterized by a permeability of at least $0.2E-12/m^2$, and preferably at least $0.8E-12/m^2$. In certain embodiments, body 510 may have a heat capacity greater than 3 Joules/(cm^3-K). In some cases, fine ash particles (e.g., below 325 mesh) may be agglomerated or pelletized into partially dense pellets, a body is then fabricated from the pellets, and body porosity at least partially results from porosity of the agglomerates.

In certain aspects, body 510 has sufficient permeability and dimensions (e.g., wall thickness, channel surface area, cross section) to allow a gaseous fluid to pass through body 510 at a linear velocity greater than 0.01 ft/second, preferably more than 0.1 ft/second, preferably greater than 0.5 ft/second, more preferably above 3 ft/second, and still more preferably above 10 ft/second.

Body 510 may be disposable, and be of a large enough size that a required treatment lifetime is achieved. Various lifetimes may be appropriate, including a replacement cycle in an automobile, train, ship or truck, a usable life for an offroad diesel apparatus, the length of a journey associated with a railway engine or ship, a duty cycle associated with a harbor vessel or associated loading/unloading/transport equipment, a harvest season associated with farm equipment, an oil change interval associated with an engine, and other lifetimes. Lifetime may include a certain number of "start-stop" operations associated with testing of a piece of backup equipment to verify performance. Some bodies may have a volume below 0.1 m^3. Other bodies may be between 0.1 and 1 m^3. Certain bodies may be between 1 and 10 m^3, and some bodies may be greater than 10, or even greater than 100 m^3 in volume. Some bodies are approximately the size of a shipping container.

In certain applications, body 510 may be regenerated during use, and in some cases, regeneration includes the combustion of particles filtered from a fluid stream passing through body 510. Regeneration may include oxidizing environments, and may involve temperatures above 400, 500, 600, 700, 800, 900, 1000, or even 1100 degrees. In some aspects, a regeneration temperature includes a range between 600 and 1100 degrees. For such applications, body 510 may fabricated from ash particles yielding compositions and crystal structures appropriate for the temperatures and chemical nature of a fluid to which body 510 is exposed. In some applications that include regeneration, body 510 may be further comprised of materials that can withstand a temperatures and environment associated with regeneration, including any species introduced in the context of an active regeneration cycle and/or thermoelastic stresses associated with regeneration. Regeneration may include backflushing.

Certain aspects include the use of processors that provide for the calculation of a lifetime or duty cycle associated with a treatment process, and in certain cases, the duty cycle may include a time until a regeneration process occurs. In certain embodiments, data are gathered and stored (e.g., in RAM or on storage media), and a time until an end of a duty cycle is calculated, often repeatedly. In some cases, operation or use of a body in an application includes calculating an expected time until an end of a duty cycle, and in some cases, adjusting operation accordingly. In certain cases, a duty cycle includes an estimated trip time, route distance, operation time, or other time and/or load-dependent characteristic, and in certain aspects, this estimated time is used to adjust a process involving the body. In certain cases, a predicted route (e.g. a garbage delivery route or a calculated route from "route mapping" software) is used to estimate a set of operation conditions. For example, a decision to operate the body in a first way (e.g., regenerate a diesel particulate filter) or a second way (not regenerate) may incorporate the predicted route or duty cycle. In select embodiments, a predicted time or distance traveled is used to determine a process adjustment that may include a regeneration step. A predicted duty cycle may be used to predict a time at which a body is expected to reach a use temperature, and in certain cases, to control a starting point of a regeneration process according to the prediction. In some cases, a regeneration process may be delayed because an estimated duty cycle time is too short to provide for complete regeneration. In other cases, regeneration may be started "early" (e.g., via additional heating of the body) in order to complete regeneration before the end of the duty cycle. Engine data may be used in any of these calculations, and certain aspects may include the control of engine control parameters (e.g., injection timing, post-injection, amount of exhaust gas recirculation).

Figure 6:
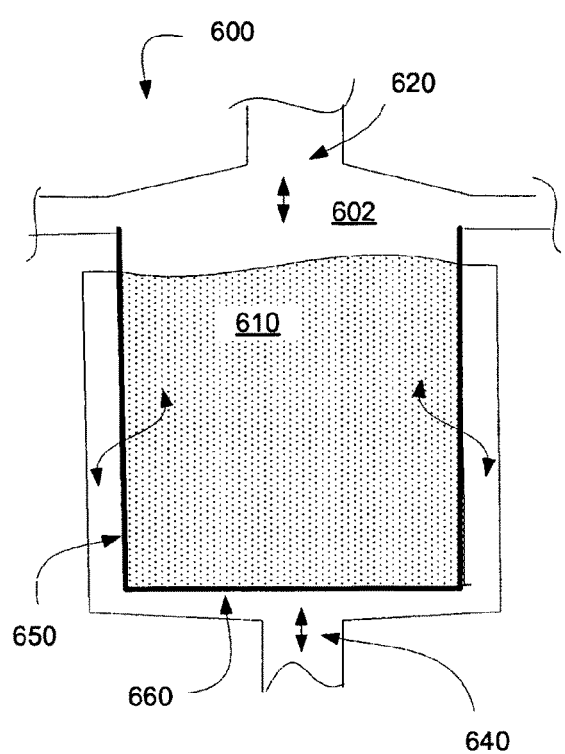
FIG. 6 is a diagrammatic representation of an exemplary embodiment.

FIG. 6 is a diagrammatic representation of an exemplary embodiment. FIG. 6 shows an apparatus 600 in which a porous body comprised of discrete particles is substantially contained by a package. In various embodiments, the discrete particles include ash particles, and the body may comprise more than 10%, 30%, 70% or even 90% ash particles. Body 610 includes ash particles having a particle size distribution such that fluid 602 may pass through body 610 from an input 620 to an output 640 (or in the opposite direction). Typically, body 610 is contained by a package 650 that includes a layer having both sufficient strength to contain body 610 and sufficient permeability to permit passage of fluid 602. In some aspects, fluid 602 flows through body 610 via gravitational forces. In other aspects, fluid 602 may be driven through body 610 via an applied pressure.

Body 610 may include a single type or several types of particles. In certain cases, body 610 may be stratified, such that layers of different particles are disposed at different points (with respect to a direction of fluid flow). In certain cases, layers are stratified from input 620 to output 640 from coarse to fine. Exemplary coarse particles may be greater than 100 micron, 500 micron, 1 mm or even 1 cm, and exemplary fine particles may be less than 100 micron, less than 50 micron, less than 10 micron, less than 1 micron, or even less than 100 nm. Certain aspects provide for several (two, three, five or even ten) discrete particle size distributions, and in some cases layers comprising each distribution may be ordered from large to small. Certain embodiments may use ash particles ranging from 0.2 to 5 mm in size.

Particles having different densities may be distributed at different vertical points, particularly in cases with substantially vertical flow as in FIG. 6. Thus particles closer to the "top" may have lower densities, and particles closer to the "bottom" may have higher densities. In many aspects, backflushing may be used to clean body 610, and the resistance of body 610 to disruption due to backflushing may be increased by using less dense particles near the top/input and denser particles near the bottom/output. Similarly, a filtration efficiency may be improved by siting coarser particles near input 620 and finer particles near output 640. Different ash sources having different chemical compositions may be used to choose appropriate particle sources. Additionally, many ash sources have broad ranges of particles, and so an arbitrary cut of a subset of particles may be chosen from an as-received particle size distribution. In a preferred embodiment, body 610 is stratified, with a first layer comprising larger, less dense particles near the top, and at least one second layer comprising denser, smaller particles near the bottom.

In some embodiments, an apparatus as shown in FIG. 6 may be operated as a fluidized bed (e.g., by driving a fluid 602 "upward" through a perforated/permeable bottom 660 that supports body 610 but allows passage of fluid 602). In certain embodiments, the properties of body 610 (and/or the treatment of fluid 602) may be improved by applying suitable mechanical (e.g., vibration), electromagnetic, acoustic or other forces.

Figure 7:
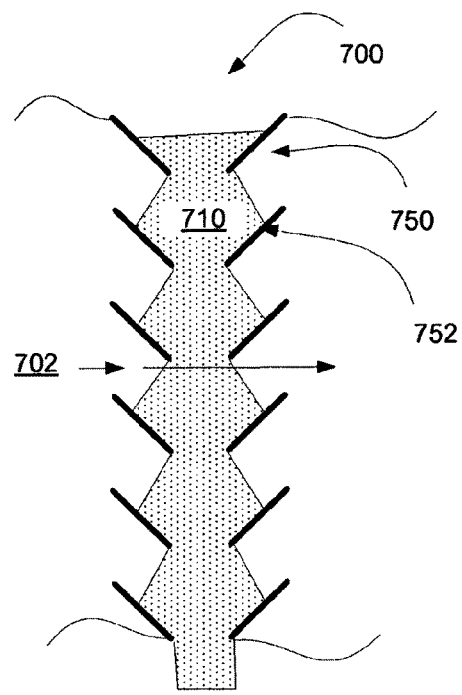
FIG. 7 is diagrammatic representation of an exemplary embodiment.

FIG. 7 provides a diagrammatic representation of an exemplary embodiment. FIG. 7 shows an apparatus 700 capable of interaction with a fluid 702. Apparatus 700 includes a porous body 710 comprised of substantially loose particles contained by a package. In various embodiments, the loose particles include ash particles, and the body may comprise more than 10%, 30%, 70% or even 90% ash particles. In this example, body 710 includes ash particles substantially contained by package 750, which includes a plurality of angled pieces 752. The design (e.g., angle, length) of angle pieces 752 is chosen in concert with various properties of ash particles included in body 710 (e.g., particle size distribution, density, interparticle attraction) such that in some aspects, substantially "loose" ash particles may be disposed in a substantially vertical package 750, held in place at an "angle of repose" associated with the settling of the ash particles against the angled pieces 752. In such an example, a fluid 702 may be introduced horizontally as shown, and caused to pass through body 710. In certain aspects, ash particles are continually fed into package 750 during use. Particles may be continually replenished (e.g., at the top of body 710) during use, and in some cases, the permeability of a body (e.g., body 710) may be dynamically modified by changing the particle size distribution associated with body 710 during use.

Body 710 may act as a cross flow gas contactor. In certain aspects, the properties of body 710 may be improved via the application of electrostatic and/or electromagnetic forces, and in some cases, properties may be improved by incorporating magnetic particles into body 710. Magnetic particles may include magnetic ash particles, such as ash particles comprising magnetite ($Fe_3O_4$), maghemite ($Fe_2O_3$) and the like. Magnetic Fe, Ni, Co, and mixtures thereof may also be included in body 710. The use of particles having a Curie temperature above a temperature of a fluid 702 being treated may be advantageous.

Apparatus 700 may be used to treat an exhaust stream from a combustion process, and in some cases electric power (possibly from the combustion process) is used to create an electromagnetic field associated with body 710. In certain versions, "normal" operation includes filtration of an exhaust stream, and normal filtration is enabled by an electromagnetic field acting on body 710. "Abnormal" operation may be used to provide failsafe operation, (e.g., to provide for reduced filtration in emergencies), and may be controlled via control of the electromagnetic field. In certain embodiments, abnormal operation results in fluid 702 substantially bypassing body 710. In other embodiments, abnormal operation results in fluid 702 "breaking through" the permeable barrier created by body 710.

Figure 8:
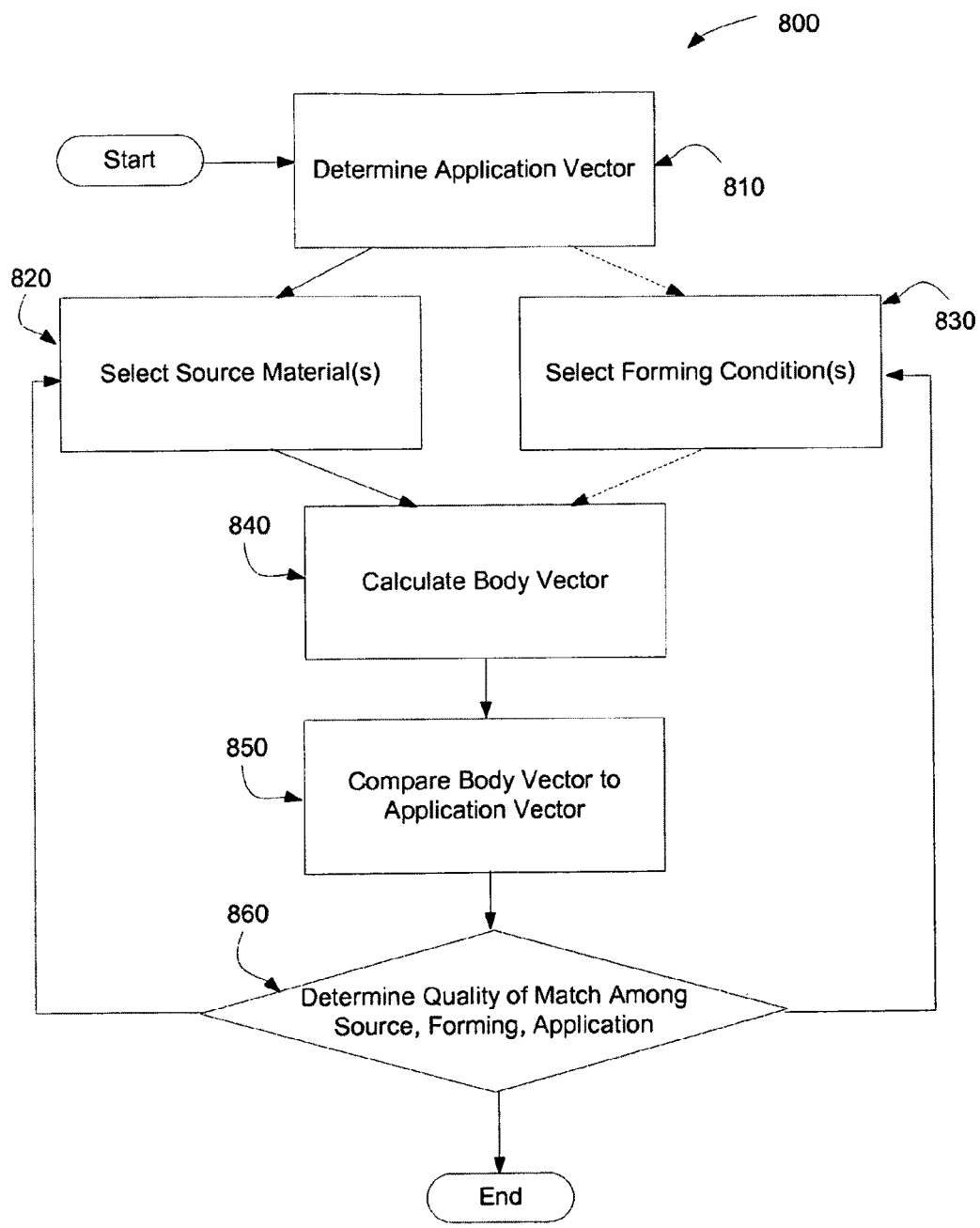
FIG. 8 is a flowchart of a process according to certain embodiments.

FIG. 8 is a flowchart of a process according to certain embodiments. Such a process may be performed by a processor executing a method 800. In step 810 an application vector is determined. An application vector may describe various characteristics of an application in which a fluid and a body interact. An application vector may also include a desired or targeted body vector, associated with a body appropriate for the application In step 820, one or more source materials is selected. Selection may include querying a database of source materials, which may comprise ash sources, non-ash sources, particle sizes available, LOI, XRD data, chemical composition and the like. For some materials, a subset of particles from a materials source may be selected, which may include sieving, filtration, floatation, magnetic separation, density separation and the like. For some materials sources, "subset" may include the entirety of the materials source. Optional step 830 may also be performed, in which case a forming process (including forming parameters) may be defined. Forming processes include casting, vibrocasting, injection molding, extruding, and other operations. Forming processes may include recipes for pastes or clays, burnout schedules, firing cycles, heat treatments, ambient atmosphere and other processes. A body vector is calculated in step 840, which may include selecting a first composition and a first forming condition and calculating properties of a body formed accordingly. In step 850 the body vector is compared to the application vector, and in step 860 a quality of match between the body vector and application vector is determined (e.g., how well the body is expected to work for the application). Depending upon fit quality, an iterative loop between steps 820/830 and step 860 may be performed. Typically, one or more input parameters (e.g., composition, particle cut, ash source, binder volume, extrusion pressure, firing cycle, dwell time and the like) may be modified for each iteration, and the result of the iteration on match quality is recorded. As such, a multidimensional parameter space may be sampled, wherein each point in the space corresponds to a different value of one or more parameters (e.g., in a body vector or application vector). In some cases, input parameters are adjusted until a satisfactory match is obtained. Steps 810, 830, 840, 850, and 860 may be complemented by experimental data, and experimental results may be substituted for calculated results. Some aspects include networked communications, and may include communications with automated experimental equipment. In certain embodiments, a multidimensional parameter space, comprising chemical, physical, structural, phase and other parameters, may be sampled, and sampled points may be evaluated for applicability to an application.

Several illustrative examples are described as follows for illustrative purposes, and are not intended to limit the scope of the claims.

Figure 9:
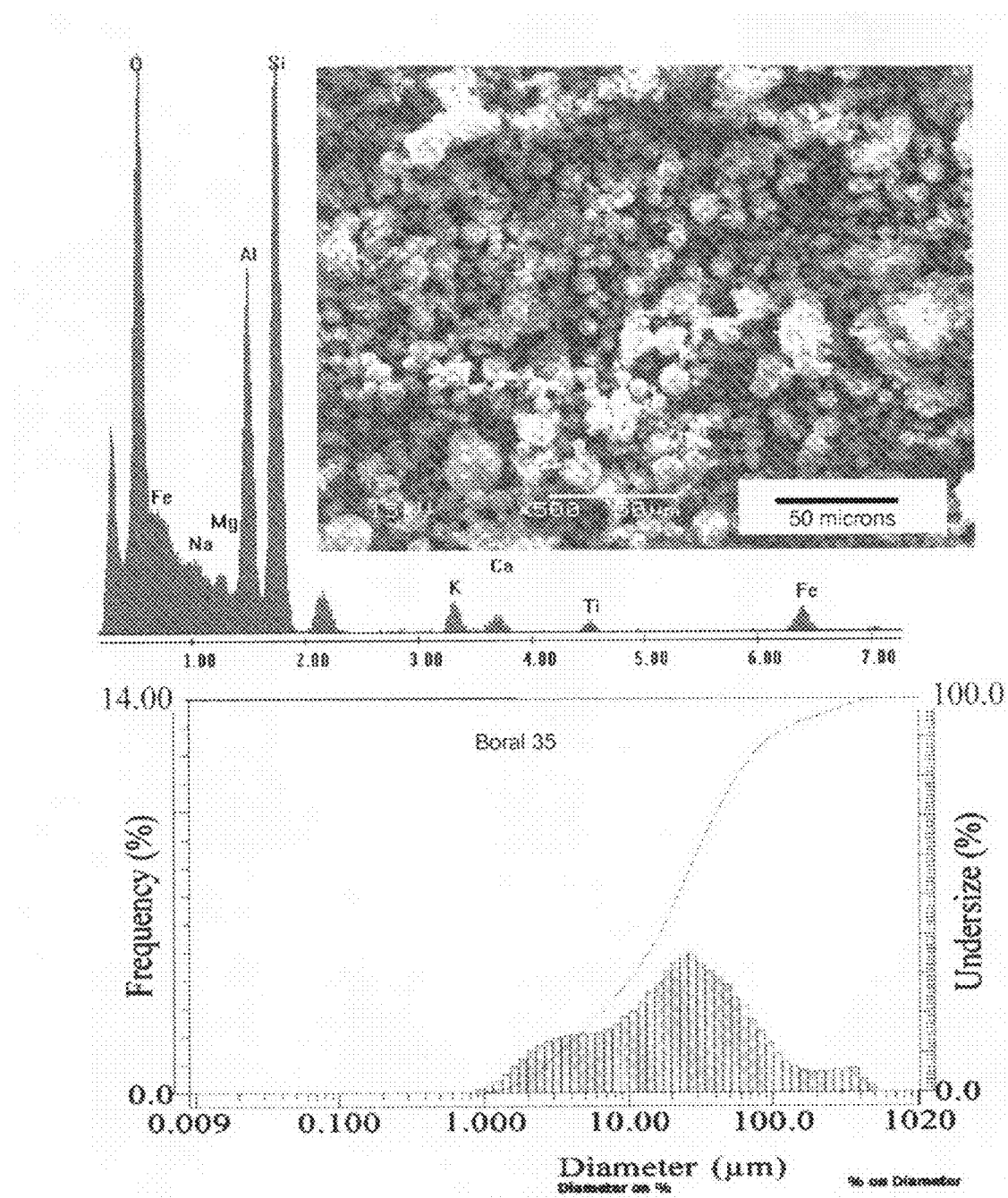
FIG. 9 shows particle size and composition information for an exemplary ash source, according to certain embodiments.

FIG. 9 shows particle size and composition information for an exemplary ash source. Described herein as Boral 35, this source was provided by Boral Material Technologies, San Antonio, Tex. Laser light scattering (Horiba LA910, Horiba Laboratory, Irvine, Calif.) showed a range of particle sizes in this sample, from below 1 micron to above 500 microns, with an average particle size of approximately 35 microns, and the following statistics: $D10=3.3$ microns; $D50=22$ microns; $D90=98$ microns. DTA/TGA analysis of this material in air at 10°/minute (Linseis L81/1550, Linseis, Inc., Robbinsville, N.J.) showed less than 1% weight loss, with no apparent melting, up to 1250 C. Many particles in this source are spherical or spheroidal, which in some embodiments may be used to improve paste properties (e.g., extrudability) and/or the ease with which materials comprising these particles may be modeled. The chemical composition (qualitative SEM/EDS, Jeol JSM 5610/EDAX detector) showed oxides of Si and Al, with smaller amounts of Fe, Mg, Ca, K, Na, and Ti.

Figure 10:
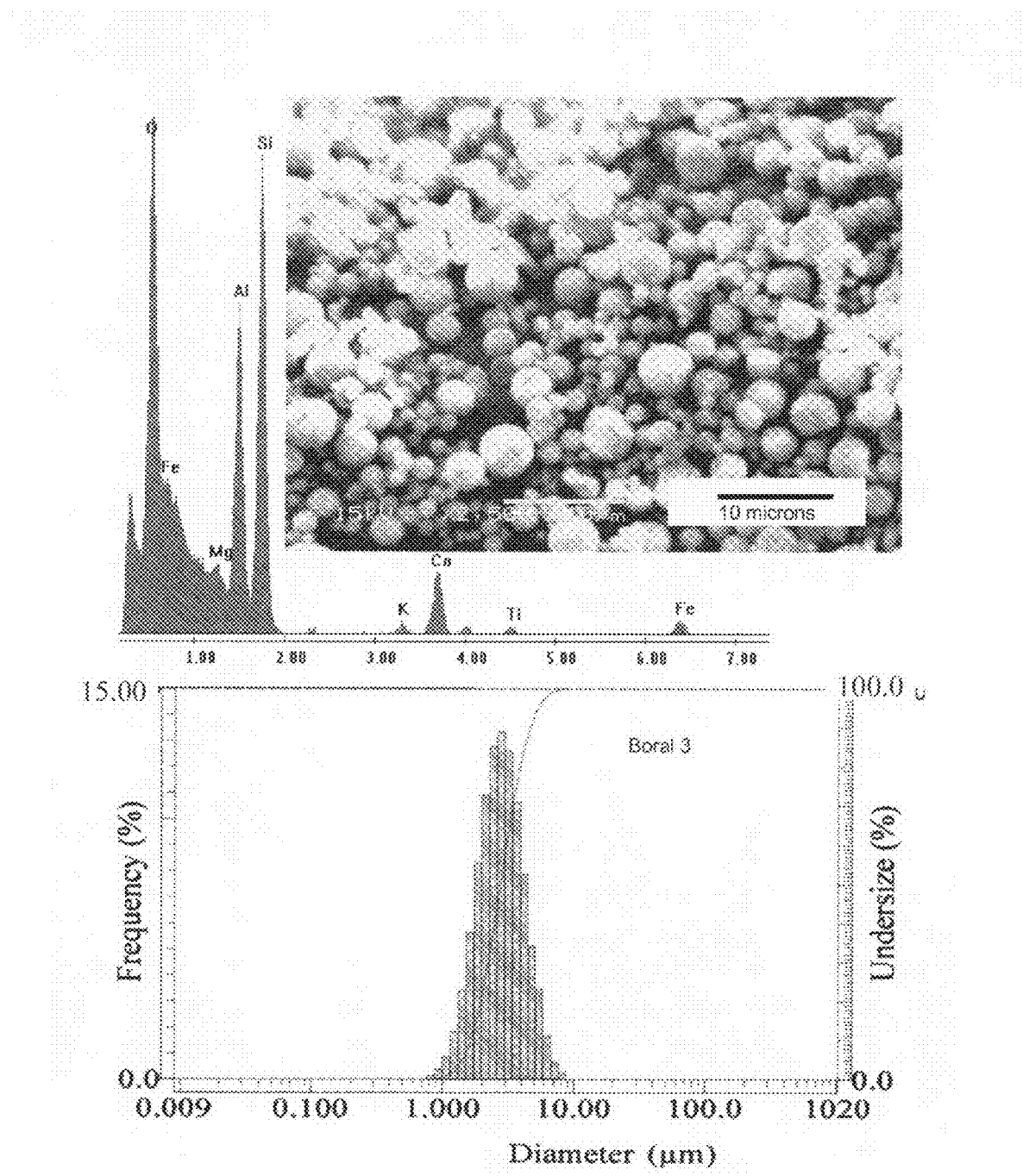
FIG. 10 shows particle size and composition information for another exemplary ash source.

FIG. 10 shows particle size and composition information for another exemplary ash source. Described herein as Boral 3, this source was provided by Boral Material Technologies, Rockdale Tex., and purportedly resulted from the Sandow Power Plant (Texas). Laser light scattering showed a distribution of particle sizes from ~800 nm to 10 microns, with an average particle size of approximately 3 microns, and generally spherical particles, and the following statistics: $D10=1.6$ microns; $D50=2.8$ microns; $D90=4.6$ microns. DTA/TGA analysis of this material showed less than 1% weight loss, with no apparent melting, up to 1250 C.

Figure 11:
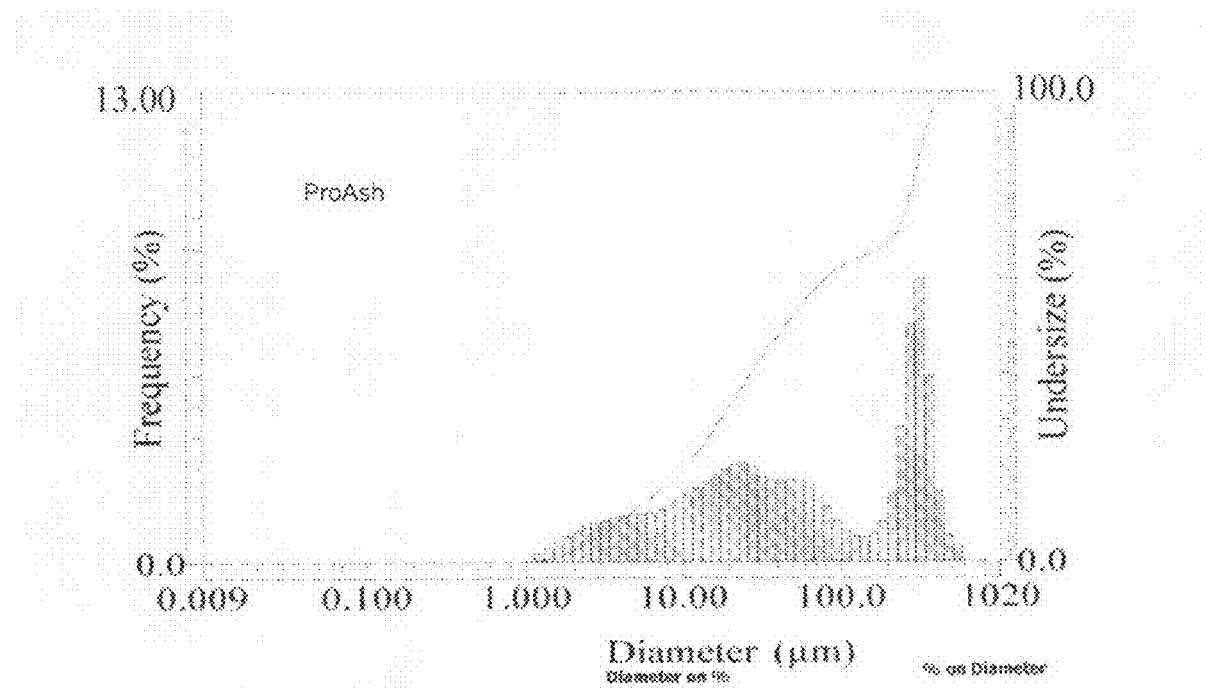
FIG. 11 shows particles size information for an additional exemplary ash source, according to certain embodiments.

FIG. 11 shows particles size information for an additional exemplary ash source. This material (ProAsh, Separation Technologies/Titan America, Troutville, Virgina). This source purportedly came from the Brunner Island Power Plant (Pennsylvania), and had a reported major composition of approximately 54% $SiO_2$, 28% $Al_2O_3$, 9% $Fe_2O_3$. This material had a particle size distribution as shown, with $D10=4.5$ microns, $D50=45$ microns, and $D90=341$ microns, and reported $LOI=1.5\%$. DTA/TGA analysis of this material showed approximately 1.8% weight loss, with no apparent melting, up to 1250 C.

Figure 12:
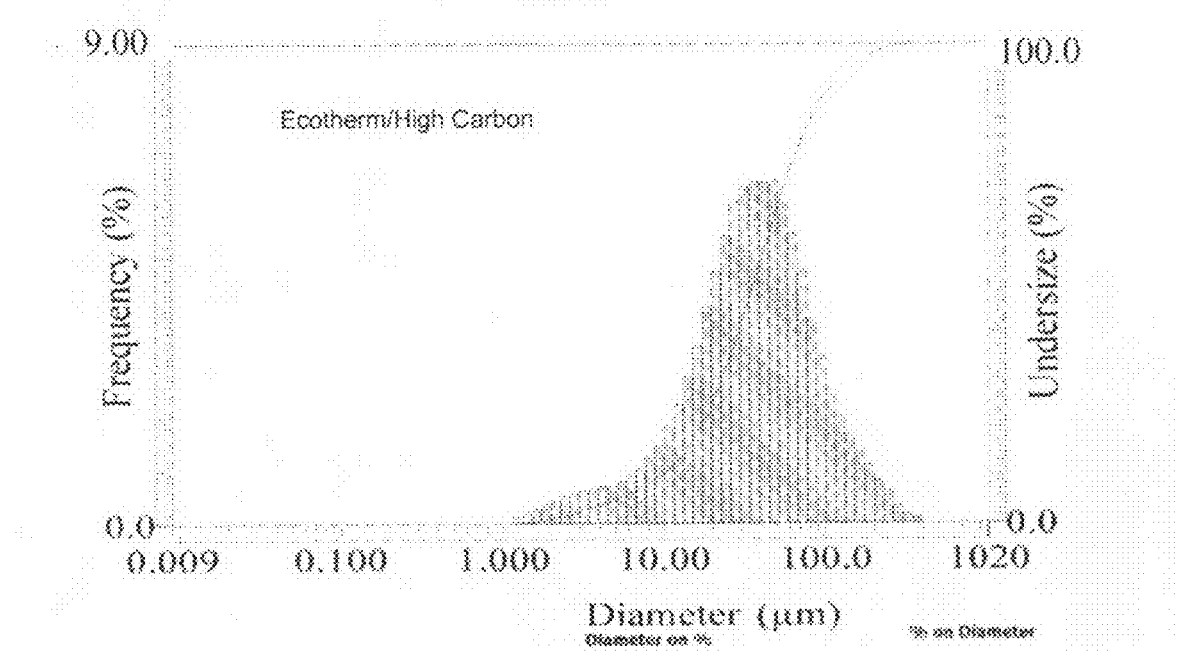
FIG. 12 shows particles size information for an additional exemplary ash source, according to certain embodiments.

FIG. 12 shows particles size information for an additional exemplary ash source. This material (Ecotherm, Separation Technologies/Titan America, Troutville, Virgina), is described herein as Pro-Ash Hi Carbon. This source was purportedly a bituminous coal fly ash from the Brunner Island Power Plant (Pennsylvania), and was reported to include a substantial amount of residual carbonaceous species. This material is an example of an ash source providing an "intrinsic" fugitive phase. This material had a particle size distribution as shown, with $D10=9.6$ microns, $D50=36$ microns, and $D90=105$ microns. DTA/TGA analsyis showed weight loss beginning at approximately 500° C. and continuing for several hundred degrees, and the sample lost approximately 40% of its mass. This sample also showed a phase transition (possibly melting) at 1130° C.

Extrinsic fugitive phases included two graphite sources from Asbury Graphite Mills (Asbury, N.J.): a fine particle size (A99) graphite, having D10=6.1 microns, D50=23 microns, D90=51 microns, and a coarse particle size (4012) graphite, having the following particle size statistics: 0.22% above 180 microns, 0.9% above 150 microns, 72% above 75 microns, 24% above 44 microns, and 2.8% below 44 microns.

Several different mixtures (i.e., clays or pastes) were made for fabrication into bodies. Table 2 lists recipes associated with these recipes, and also includes methods used to shape these pastes into forms. Several samples were formed using extrusion, and included rheology modifiers (YB-155 and YB-113C, Yuken America, Novi, Mich.) which may also function as fugitive phases. Other samples were formed by casting samples into a ceramic crucible, tapping the crucible approximately 20 times to settle the sample and allowing the sample to set (described herein as vibrocasting).

93 C/h to 800 C, hold at 800 C for 2 h, ramp 150 C/h to 1050 C, hold at 1050 C for 5.0 h, cool at 150 C/h to room T. Fired samples were generally solid and strong enough for easy handling.

X-ray diffraction of Sample 1 after firing showed predominantly quartz and mullite, with smaller amounts of albite (calcian), possibly cristobalite, and hematite. Thermal expansion was measured between room temperature and 1000° C. at 3° C./minute (Linseis L75D/1550, Linseis, Inc., Robbinsville, N.J.) which yielded a CTE of approximately 5E-6/° C.

Figure 13:
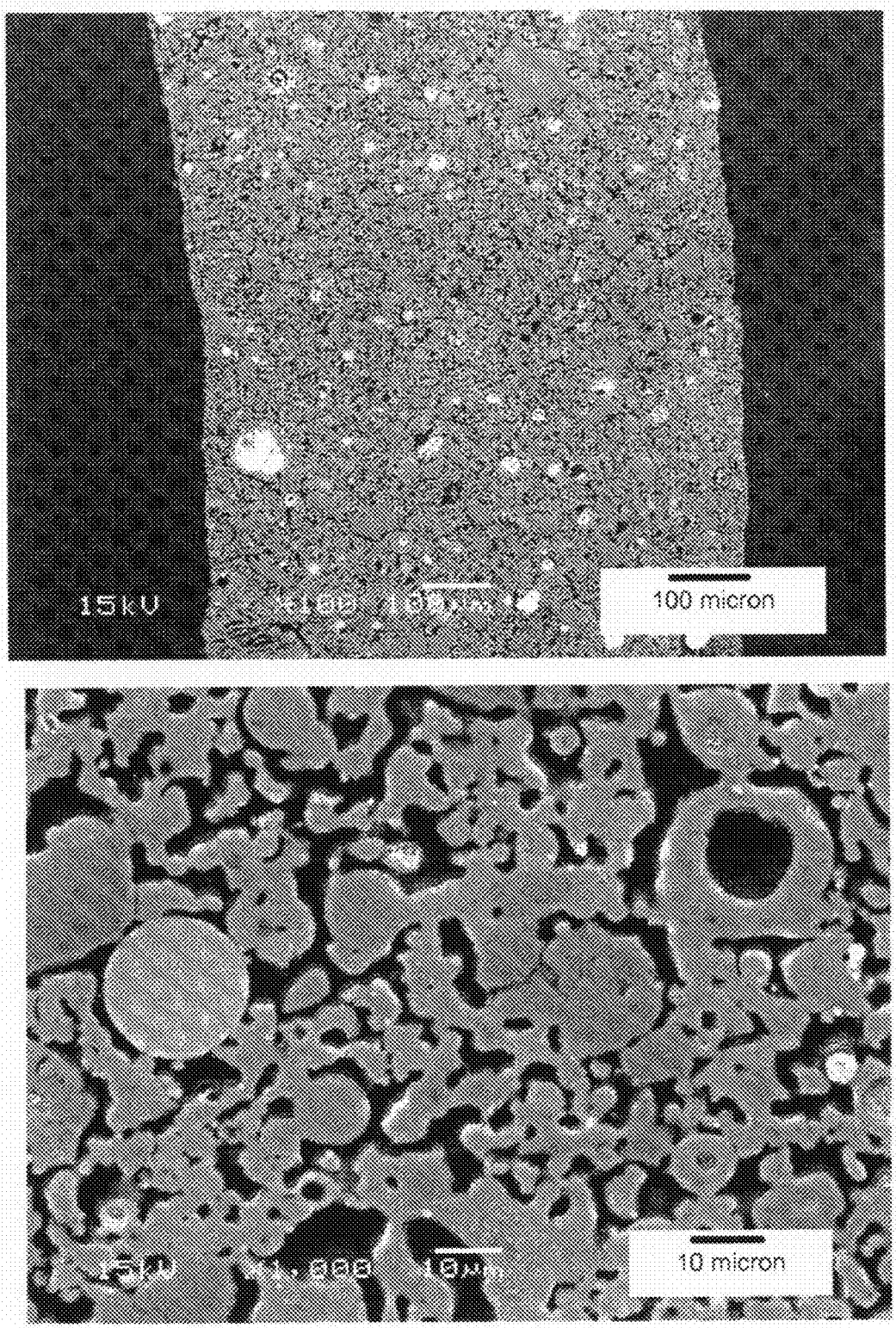
FIG. 13 shows two cross sectional electron micrographs of a Sample 1 at different magnifications, according to certain embodiments.

FIG. 13 shows two cross sectional electron micrographs of Sample 1 at different magnifications. This example was a tubular body having a diameter of approximately 0.75 cm and wall thickness of approximately 1 mm. This sample displayed sufficient mechanical integrity for normal handling operations typical of ceramic processing.

TABLE 2

Batch Compositions - 100 wt. % of total solids (ceramic and graphite raw materials) and Liquid

| | Sample: | | | | | | | | | | |
|---|---|---|---|---|---|---|---|---|---|---|---|
| | 1 | 2 | 3 | Baseline | 2F | 3F | 4F | 6C | 7C | 8C | 8C-5 |
| MATERIALS | | | | | | | | | | | |
| Boral 3 μm | 31.3 | 31.3 | 44.8 | 31.5 | 29.8 | 26.7 | 19.6 | 29.3 | 25.6 | 17.7 | 17.7 |
| Boral 35 μm | 31.3 | 31.3 | — | 42.2 | 39.9 | 35.8 | 26.3 | 39.2 | 34.2 | 23.7 | 23.7 |
| Pro-Ash High Carbon | — | — | 24 | — | — | — | — | — | — | — | — |
| Ashbury A99 Graphite[a] | — | — | — | — | 3.2 | 8.7 | 21.4 | — | — | — | — |
| Ashbury 4012 Graphite[b] | — | — | — | — | — | — | — | 4.9 | 12.7 | 29.3 | 29.3 |
| Darvan C | — | — | 0.2 | 0.2 | 0.2 | 0.2 | 0.2 | 0.2 | 0.2 | 0.2 | 0.2 |
| Yuken YB155 binder/plasticizer | 8.3 | 8.3 | — | — | — | — | — | — | — | — | — |
| Yuken YB133C binder/plasticizer | 8.3 | 8.3 | — | — | — | — | — | — | — | — | — |
| DI Water | 20.9 | 20.9 | 31 | 26.1 | 26.9 | 28.6 | 32.5 | 26.4 | 27.3 | 29.1 | 29.1 |
| FORMING | | | | | | | | | | | |
| Method | Extruded | Extruded | Extruded | Vibrocast | Vibrocast | Vibrocast | Vibrocast | Vibrocast | Vibrocast | Vibrocast | Vibrocast |
| Shape | Tube | Solid Rod | Solid Rod | Disk | Disk | Disk | Disk | Disk | Disk | Disk | Disk |
| FIRING | | | | | | | | | | | |
| Cycle # | 1 | 1 | 1 | 1 | 2 | 2 | 2 | 2 | 2 | 2 | 3 |
| POROSITY | | | | | | | | | | | |
| Med. Pore Dia. (microns)[c] | 2.0 | 2.1 | 3.7 | 1.8 | 2.3 | 3.2 | 6.4 | 2.2 | 3.2 | 11.8 | 12.2 |
| Bulk Density (g/cc)[c] | 1.6 | 1.7 | 1.3 | 1.8 | 1.7 | 1.5 | 1.1 | 1.6 | 1.5 | 1.0 | 0.9 |
| Typ. Porosity (%)[c] | 37 | 40 | 54 | 34 | 35 | 41 | 61 | 39 | 45 | 66 | 67 |

TGA/DTA analysis was performed on Sample 1. This sample showed a weight loss beginning at 125 C, wt. loss peak and exotherm at 277 C, and no apparent melting (to 1250 C/max T of run). In some embodiments, different fugitive phases are chosen, such that the burnout of the phases occurs at different temperatures.

Samples in Table 2 were subjected to the following firing cycles: Firing Cycle #1: ramp 150 C/h to 550 C, hold at 550 C for 2 h, ramp 150 C/h to 1050 C, hold at 1050 C for 0.5 h, cool at 200 C/h to room temperature; Firing Cycle #2: ramp 17 C/h to 93 C, hold at 93 C for 2 h, ramp 93 C/h to 500 C, hold at 500 C for 4 h; ramp 93 C/h to 800 C, hold at 800 C for 2 h, ramp 150 C/h to 1050 C, hold at 1050 C for 0.5 h, cool at 150 C/h to room T; Firing cycle #3: ramp 17 C/h to 93 C, hold at 93 C for 2 h, ramp 93 C/h to 500 C, hold at 500 C for 4 h; ramp Porosity was measured using Hg porosimetry (Micromeritics Autopore IV 9500, performed by Delta Labs, North Huntingdon, Pa.).

Figure 14:
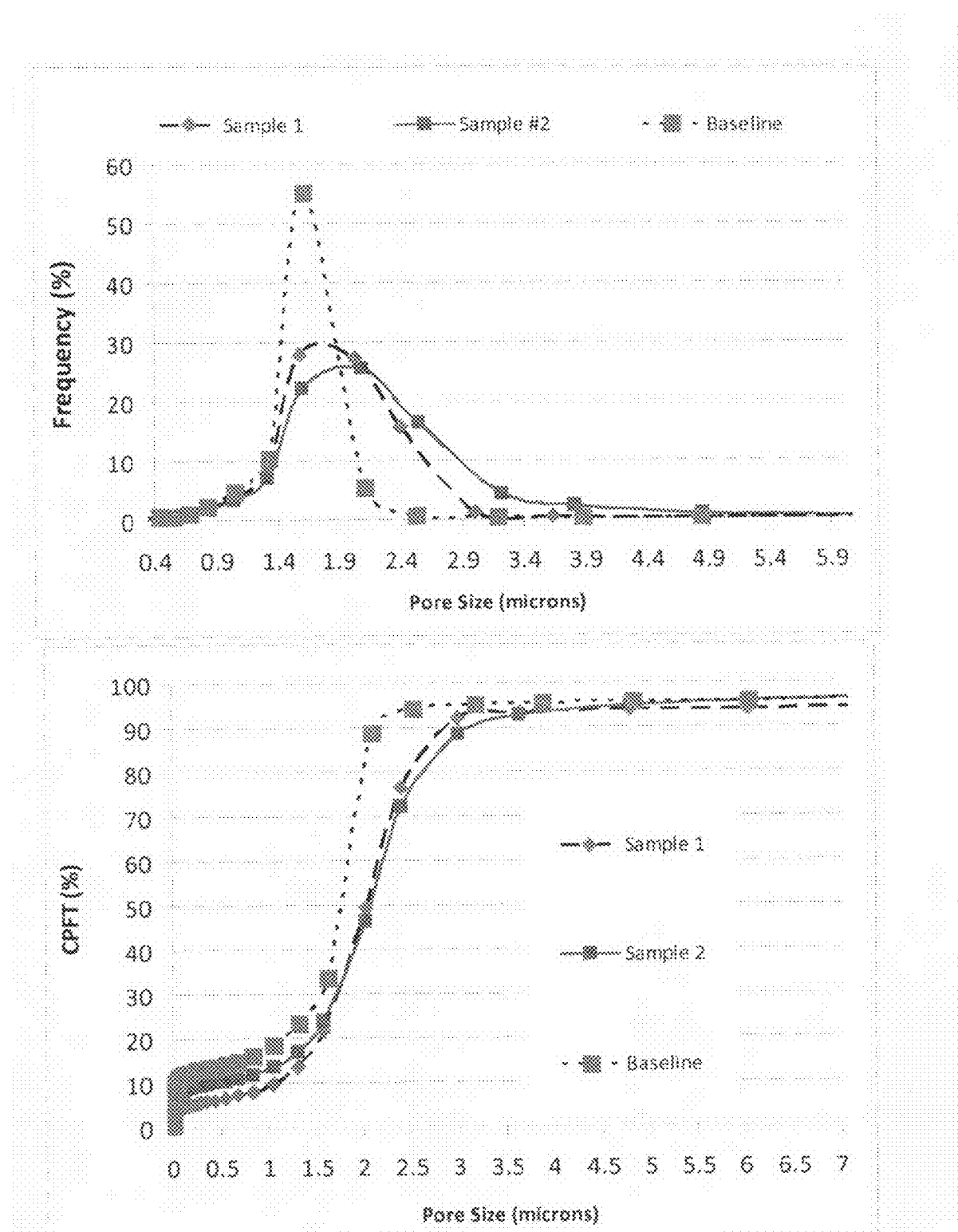
FIG. 14 shows pore size information associated with several exemplary bodies, according to certain embodiments.

FIG. 14 shows pore size information associated with several exemplary bodies. This figure includes a vibrocast sample without an organic binder and two extruded samples having organic binder. Sample 1 was extruded using a high pressure, automated extruder. Sample 2 was extruded using a hand extruder. Microstructure may be generally controlled with mixture composition, and a variety of forming methods usable for forming bodies from particles may be used with various embodiments. Some mixtures may be formable via several different methods.

Figure 15:
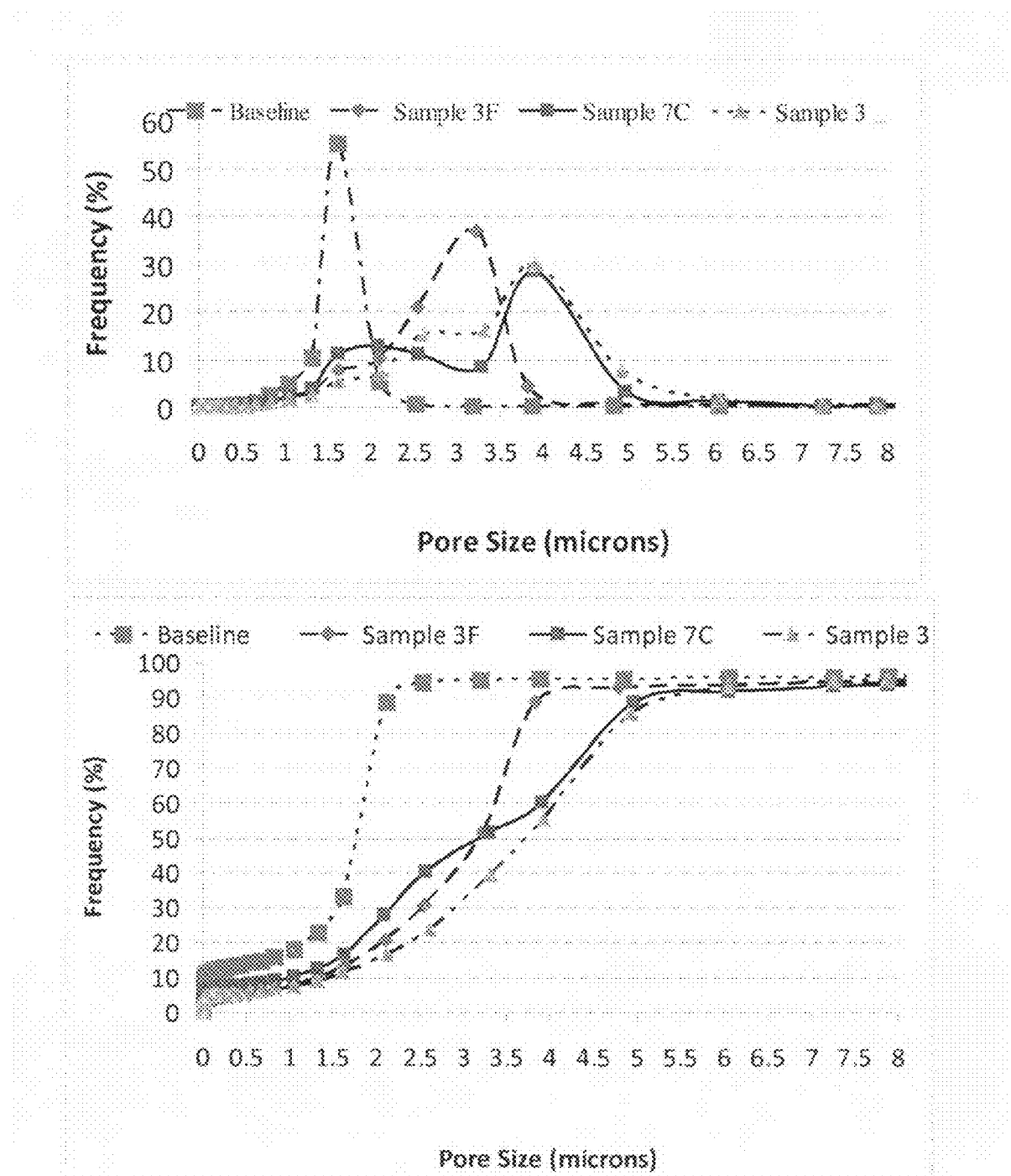
FIG. 15 shows pore size information associated with several exemplary bodies, according to certain embodiments.

FIG. 15 shows pore size information associated with several exemplary bodies. This figure compares bodies incorporating an extrinsic fugitive phase (added to an ash source) to bodies incorporating an intrinsic fugitive phase, associated with the ash source and generally resulting from a process that produced the ash particles (i.e., Sample 3). Samples 3 and 7 C had similar concentrations of different fugitive phases (intrinsic as ~40% of the Pro-Ash High Carbon mass, vs. extrinsic Asbury 4012). Porosity may be controlled via the use of one or many fugitive phases, which may include intrinsic and/or extrinsic fugitive phases, and may have similar and/or different particle sizes.

Figure 16:
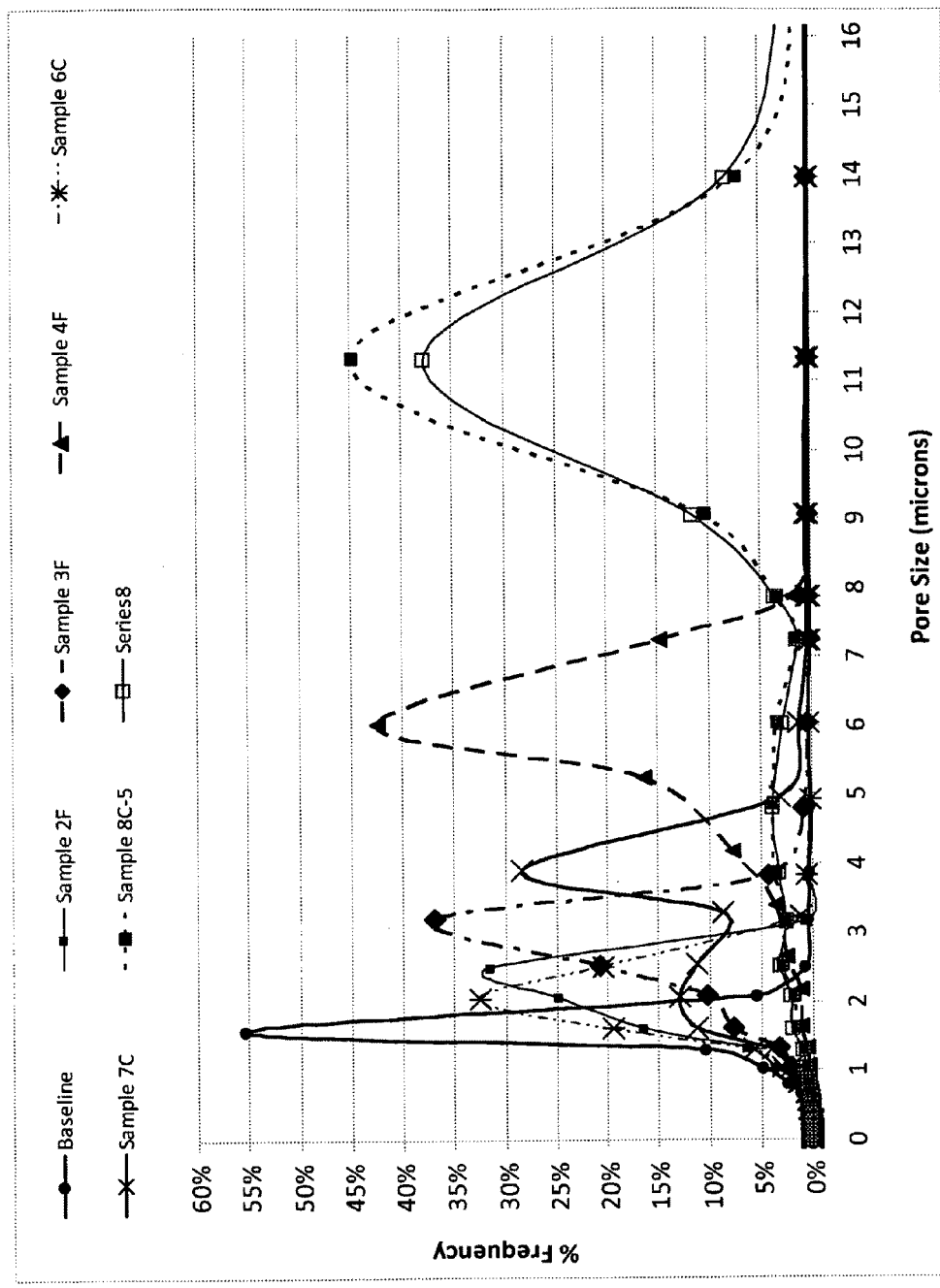
FIG. 16 shows pore size information associated with several exemplary bodies, according to certain embodiments.

FIG. 16 shows pore size information associated with several exemplary bodies. This figure shows a range of pore size distributions that may be created, according to various embodiments. Larger ranges, smaller ranges, different pore size distributions and other properties may generally be created by suitable changes in processing parameters, and porosity and pore size distribution may generally be controlled. Pore connectivity may be controlled using forming methods incorporating various shear, compressive and tensile forces, and may also benefit from the use of anisotropic particles, particularly anisotropically shaped fugitive particles (e.g., whiskers, platelets).

Figure 17:
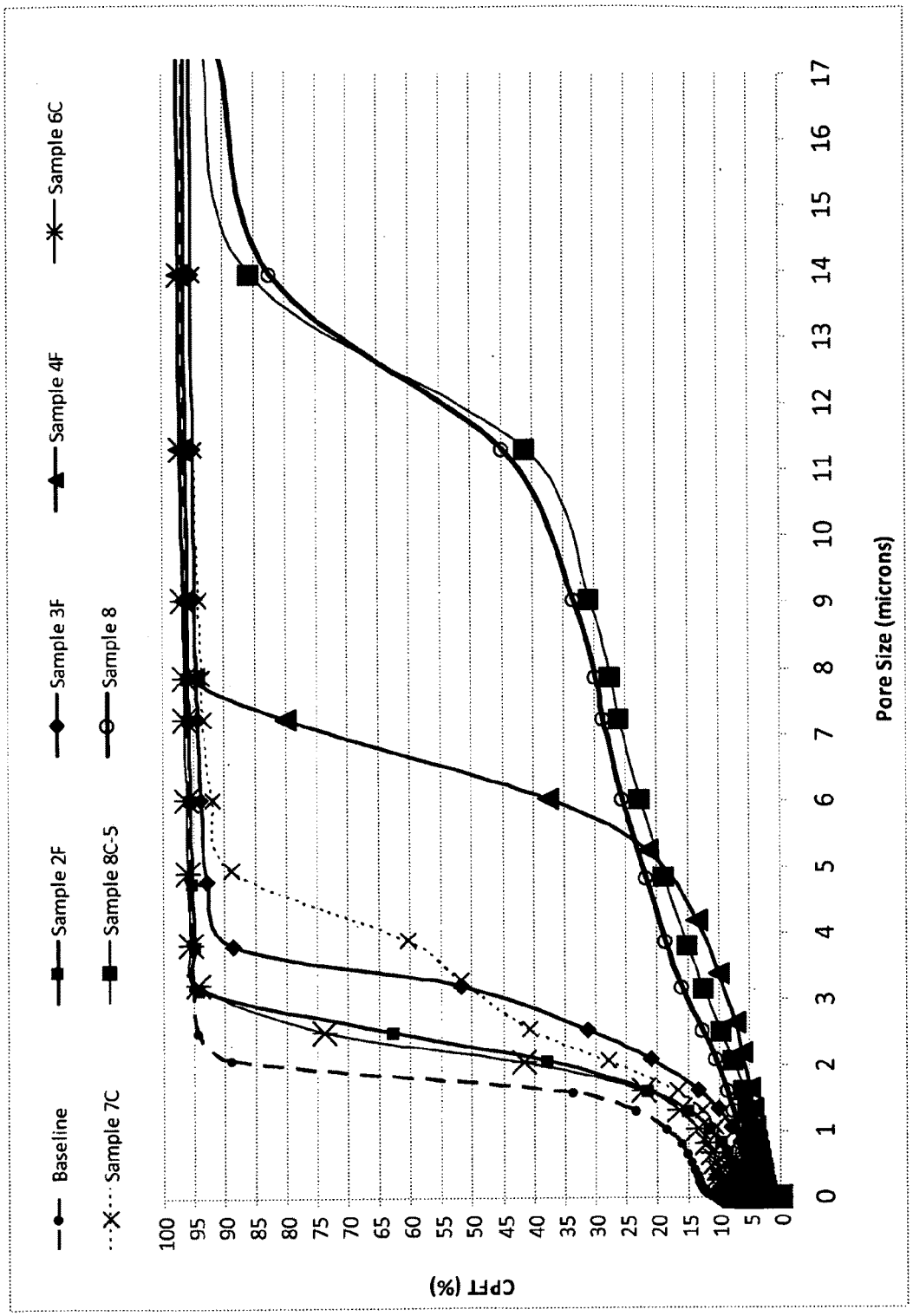
FIG. 17 shows CPFT (cumulative percent finer than) data describing the porosity of several fired samples.

FIG. 17 shows CPFT (cumulative percent finer than) data describing the porosity of several fired samples.

Table 3 summarizes porosity measurements for various samples.

TABLE 3

| Sample | Median Pore Diameter (micron) = | Bulk Density at 0.52 psia (g/cc) | % Porosity |
|---|---|---|---|
| Baseline 3-35 | 1.8 | 1.81 | 33.6 |
| 2F 3-35 + fineC | 2.3 | 1.70 | 35.3 |
| 3F 3-35 + fineC | 3.2 | 1.50 | 40.9 |
| 4F 3-35 + fineC | 6.4 | 1.07 | 61.2 |
| 6C 3-35 + coarseC | 2.2 | 1.63 | 39.2 |
| 7C 3-35 + coarseC | 3.2 | 1.46 | 45 |
| 8C 3-35 + coarseC | 11.8 | 1.00 | 65.8 |
| 8C+ 5 Hr. Soak | 12.2 | 0.94 | 66.5 |
| 3-35-Extrude | 2.0 | 1.62 | 37.4 |
| 3-35-LowPExtrude | 2.1 | 1.71 | 39.7 |
| 3-ProAsh__HiC-Vibcast | 3.7 | 1.29 | 53.8 |

Figure 18:
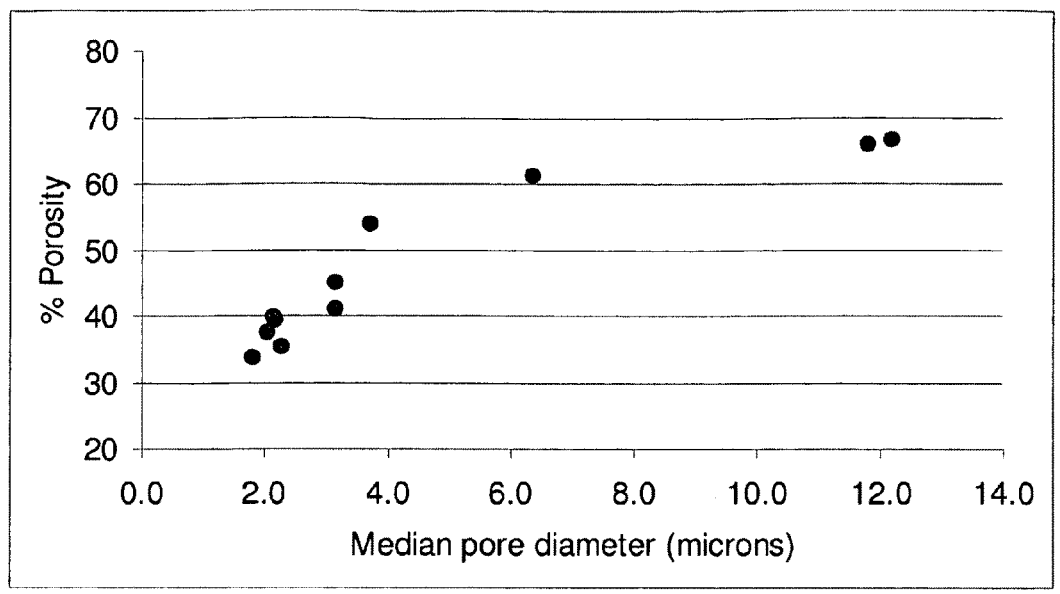
FIG. 18 is a plot of average porosity vs. median pore diameter for several bodies, according to certain embodiments.

FIG. 18 is a plot of average porosity vs. mean pore diameter for several bodies, according to certain embodiments. Median pore diameter and percentage porosity may be controlled independently. In some embodiments, an application vector may include a desired median pore diameter and % porosity, and various samples are calculated/predicted and/or fabricated/measured, and various parameters are adjusted until a body vector associated with a resulting body sufficiently matches the application vector.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of treating a first fluid, the method comprising:
providing a system including:
a container having an inlet and an outlet, and
a body disposed between the inlet and outlet, the body comprised of at least 30% of one or more ash sources, the one or more ash sources having a particle size distribution that is at least bimodal, the body having at least 20% porosity, and disposed in the container such that the first fluid reacts with the body during passage from the inlet to the outlet; and
causing the first fluid to pass from the inlet to the outlet via the body.

2. The method of claim 1, wherein at least one of the ash sources includes ash particles that have a particle size distribution for which D90 does not exceed 98 microns.

3. The method of claim 1, wherein treating includes causing a chemical reaction between the one or more ash sources and a contaminant in the first fluid.

4. The method of claim 1, wherein the first fluid includes a dissolved oxide, and treating includes reacting at least some of the dissolved oxide with at least one of the ash sources.

5. The method of claim 1, wherein at least a portion of the body includes a stratified region.

6. The method of claim 1, wherein the first fluid includes an aqueous liquid.

7. The method of claim 1, wherein the first fluid includes one or more oxides of carbon that react with the body.

8. The method of claim 1, wherein the body filters a contaminant from the first fluid as it passes from the inlet to the outlet.

9. The method of claim 1, wherein the body is comprised of at least 70% of the one or more ash sources.

10. A method of treating a first fluid, the method comprising:
providing a system including:
a container having an inlet and an outlet, and
a body disposed between the inlet and outlet, the body comprised of at least 30% of one or more ash sources, the body having at least 20% porosity, and disposed in the container such that the first fluid reacts with the body during passage from the inlet to the outlet; and
causing the first fluid to pass from the inlet to the outlet via the body when the body is at a temperature between 200 and 1200 degrees Celsius.

11. The method of claim 10, wherein at least a portion of the body has a permeability of at least 0.5 E-12/m^2.

12. The method of claim 10, wherein at least a portion of the body has a surface area greater than 1,000 square inches per gram.

13. The method of claim 10, further comprising adding a catalyst to the first fluid to enhance a reaction associated with the body.

14. The method of claim 10, further comprising regenerating the body.

15. The method of claim 10, wherein the body has greater than 40% porosity.

16. The method of claim 10, wherein the body comprises substantially loose particles, and the container hydrostatically supports the body.

17. The method of claim 10, wherein the first fluid includes one or more oxides of carbon that react with the body.

18. The method of claim 10, wherein the body filters a contaminant from the first fluid as it passes from the inlet to the outlet.

19. A method of treating a first fluid, the method comprising:
providing a system including:
a container having an inlet and an outlet, and
a body disposed between the inlet and outlet, the body comprised of at least 30% of one or more ash sources, the body having at least 20% porosity, and disposed in the container such that the first fluid reacts with the body during passage from the inlet to the outlet;
inducing an electrochemical gradient across the body; and
causing the first fluid to pass from the inlet to the outlet via the body.

20. The method of claim 19, wherein the first fluid includes an aqueous liquid, and treating includes reacting a dissolved contaminant in the first liquid with the body.

21. The method of claim 19, wherein the first fluid includes one or more oxides of carbon that react with the body.

22. The method of claim 19, wherein the first fluid is caused to pass through the body at a linear velocity greater than 0.01 ft/second.

* * * * *